United States Patent
Siomina et al.

(10) Patent No.: US 9,594,149 B2
(45) Date of Patent: Mar. 14, 2017

(54) FINGERPRINTING WITH RADIO CHANNEL RELATED INFORMATION

(75) Inventors: Iana Siomina, Solna (SE); Karl Torbjörn Wigren, Uppsala (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 313 days.

(21) Appl. No.: 13/638,949

(22) PCT Filed: Mar. 28, 2012

(86) PCT No.: PCT/SE2012/050340
§ 371 (c)(1),
(2), (4) Date: Oct. 2, 2012

(87) PCT Pub. No.: WO2013/062462
PCT Pub. Date: May 2, 2013

(65) Prior Publication Data
US 2013/0109405 A1    May 2, 2013

Related U.S. Application Data

(60) Provisional application No. 61/552,471, filed on Oct. 28, 2011.

(51) Int. Cl.
*H04W 64/00* (2009.01)
*H04W 24/00* (2009.01)
*G01S 5/02* (2010.01)

(52) U.S. Cl.
CPC .......... *G01S 5/0252* (2013.01); *H04W 64/00* (2013.01)

(58) Field of Classification Search
CPC .... G01S 5/0252; G01S 5/0242; H04W 64/00; H04W 64/003; H04W 64/006; H04W 24/00

(Continued)

(56) References Cited

U.S. PATENT DOCUMENTS

2001/0022558 A1    9/2001 Karr, Jr. et al.
2005/0191965 A1*   9/2005 Yu et al. .......... 455/67.16
(Continued)

FOREIGN PATENT DOCUMENTS

WO    2009096839 A1    8/2009
WO    2013022397 A1    2/2013

OTHER PUBLICATIONS

Polaris Wireless, "Addition of a RF Pattern Matching to UE Positioning description section", Change Request, R2-101584, 3GPP RAN2 Meeting #68bis, Feb. 22-26, 2010, San Francisco, CA.
(Continued)

*Primary Examiner* — Allahyar Kasraian
(74) *Attorney, Agent, or Firm* — Coats & Bennett, PLLC

(57) ABSTRACT

Example Embodiments presented herein are directed towards a radio node (101, 130, 102), and corresponding methods therein, for fingerprinting positioning measurements. The radio node may be configured to provide a fingerprinting measurement result comprising radio channel related information. Non-limiting examples of radio channel information may be Doppler, speed and/or delay spread information. Example embodiments presented herein may also be directed towards a positioning node (140), and corresponding methods therein, for fingerprinting positioning management. The positioning node may be configured to receive radio channel related information from the radio node and generate a radio fingerprint based on the received radio channel related information.

22 Claims, 11 Drawing Sheets

(58) Field of Classification Search
USPC .......................................... 455/456.1–456.6
See application file for complete search history.

(56) References Cited

U.S. PATENT DOCUMENTS

| | | |
|---|---|---|
| 2007/0026870 A1* | 2/2007 | Spain et al. ............... 455/456.1 |
| 2009/0075672 A1* | 3/2009 | Jones et al. ................ 455/456.1 |
| 2011/0039517 A1* | 2/2011 | Wigren et al. ............. 455/404.2 |
| 2011/0039580 A1* | 2/2011 | Wigren et al. ............. 455/456.1 |
| 2011/0207477 A1* | 8/2011 | Siomina ................ G01S 5/0278 |
| | | 455/456.2 |
| 2011/0244879 A1 | 10/2011 | Siomina et al. |
| 2011/0319097 A1* | 12/2011 | Wirola et al. .............. 455/456.1 |
| 2013/0033999 A1* | 2/2013 | Siomina et al. ............. 370/252 |

OTHER PUBLICATIONS

Sun, G. et al., "Signal Processing Techniques in Network-Aided Positioning, A survey of state-of-the-art positioning designs," IEEE Signal Processing Magazine, Jul. 2005, pp. 12-23, vol. 22, No. 4, IEEE Service Center, Piscataway, NJ.

* cited by examiner

FINGERPRINTING WITH RADIO CHANNEL RELATED INFORMATION

TECHNICAL FIELD

Example embodiments presented herein are directed towards a radio node, and corresponding method therein, for fingerprinting positioning measurement with the use of radio channel related information. Example embodiments presented herein are also directed towards a positioning node, and corresponding method, for fingerprinting positioning management with the use of radio channel related information.

BACKGROUND

Long Term Evolution Systems

In a typical cellular system, also referred to as a wireless communications network, wireless terminals, also known as mobile stations and/or user equipment units communicate via a Radio Access Network (RAN) to one or more core networks. The wireless terminals may be mobile stations or user equipment units such as mobile telephones also known as "cellular" telephones, and laptops with wireless capability, e.g., mobile termination, and thus may be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "eNode B" or "Node B" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The Third Generation Partnership Project (3GPP) has undertaken to evolve further the UTRAN and GSM based radio access network technologies. Long Term Evaluation (LTE) together with Evolved Packet Core (EPC) is the newest addition to the 3GPP family.

An emerging field within the area of wireless communications is positioning or localization. The possibility to determine the position of a mobile device has enabled application developers and wireless network operators to provide location based, and location aware, services. Examples of those are guiding systems, shopping assistance, friend finder, presence services, community and communication services and other information services giving the mobile user information about their surroundings. In addition to the commercial services, the governments in several countries have put requirements on the network operators to be able to determine the position of an emergency call. For instance, the governmental requirements in the USA (FCC E911) state that it must be possible to determine the position of a certain percentage of all emergency calls, with high accuracy and within a specified time limit. The requirements make no difference between indoor and outdoor environment.

SUMMARY

There is a need to provide greater accuracy in positioning and localization for wireless communications. Thus, at least one object of some of the example embodiments presented herein is to provide a means of positioning and localization in wireless communications systems in a cost effective and efficient manner. According to some of the example embodiments, this object may be satisfied with the use of radio channel related information in positioning measurements and position estimation. In particular, such radio channel related information may be utilized in fingerprinting positioning measurements, the generation of fingerprints, and/or position estimates.

Some of the example embodiments may be directed towards a method, in a radio node, for fingerprinting positioning measurement. The radio node is comprised in a wireless communications network. The method comprises performing a fingerprinting positioning measurement based on a location-related request. The method further comprises reporting, to a network node, a measurement result of the fingerprinting positioning measurement in a positioning-related message, where the measurement result comprises radio channel related information.

Some of the example embodiments may be directed towards a radio node for fingerprinting positioning measurement. The radio node is comprised in a wireless communications network. The radio node comprises measurement circuitry configured to perform a fingerprinting positioning measurement according to a location-related request. The radio node further comprises a transmitter port configured to report, to a network node, a measurement result of the fingerprinting positioning measurement in a positioning message, where the measurement result comprises radio channel related information.

Some of the example embodiments may be directed towards a method, in a positioning node, for fingerprinting positioning management. The positioning node is comprised in a wireless communications network. The method comprises receiving, from a radio node, radio channel related information associated with a positioning measurement. The method further comprises generating a radio fingerprint based on the received radio channel related information.

Some of the example embodiments may be directed towards a positioning node, for fingerprinting positioning management. The positioning node is comprised in a radio network. The positioning node comprises a receiver port configured to receive, from a radio node, radio channel related information associated with a positioning measurement configuration. The positioning node further comprises calculating circuitry configured to generate a radio fingerprint based on the received radio channel related information.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DEFINITIONS

3GPP Third Generation Partnership Project
A-GNSS Assisted Global Navigation Satellite System
ABS Almost Blank Subframe
AECID Adaptive Enhanced Cell Identity
AoA Angle of Arrival
BSC Base Station Controller
CID Cell Identity
CRS Cell specific Reference Signals
CSG Closed Subscriber Group
DL Downlink
E-CID Enhanced Cell Identity
E-SMLC Enhanced Serving Mobile Location Centre
EPC Evolved Packet Core
GAD Geographical Area Description
GMLC Gateway Mobile Location Centre
GNSS Global Navigation Satellite System
GPS Global Positioning System
GPRS General Packet Radio Service
GSM Global System for Mobile communications
HLR Home Location Register
HSS Home Subscriber Server
IPDL Idle Period in Downlink
LCS Location Services
LMU Location Measuring Unit
LOS Line of Sight
LPP LTE Positioning Protocol
LPPA LTE Positioning Protocol A
LPPe LTE Positioning Protocol extension
LTE Long Term Evaluation
MDT Minimization of Drive Tests
MME Mobility Management Entity
MSC Mobile Switching Centre
O&M Operation and Maintenance
OMA Open Mobile Alliance
OTDOA Observed Time Difference of Arrival
PSAP Public Safety Answering Point
PGW Packet Data Network Gateway
PRS Positioning Reference Signals
RAB Radio Base Station
RACH Random Access Channel
RAN Radio Access Network
RAT Radio Access Technology
RF Radio Frequency
RNC Radio Network Controller
RRC Radio Resource Control
RSTD Reference Signal Time Difference
RTT Round Trip Time
Rx-Tx Receive-Transmit time difference
SET SUPL Enabled Terminal
SGSN Serving GPRS Support Node
SGW Serving Gateway
SLP SUPL Location Platform
SON Self-Optimizing/Organizing Network
SPC SUPL Positioning Centre
SRS Sounding Reference Signals
SUPL Secure User Plane Location
TA Timing Advance
TDOA Time Difference of Arrival
TOA Time of Arrival
UE User Equipment
UL Uplink
UMTS Universal Mobile Telecommunications System
UTDOA UplinkTime Difference of Arrival
UTRAN UMTS Terrestrial Radio Access Network
VMSC Visited Mobile Switching Centre
WCDMA Wideband Code Division Multiple Access

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Figure 1:
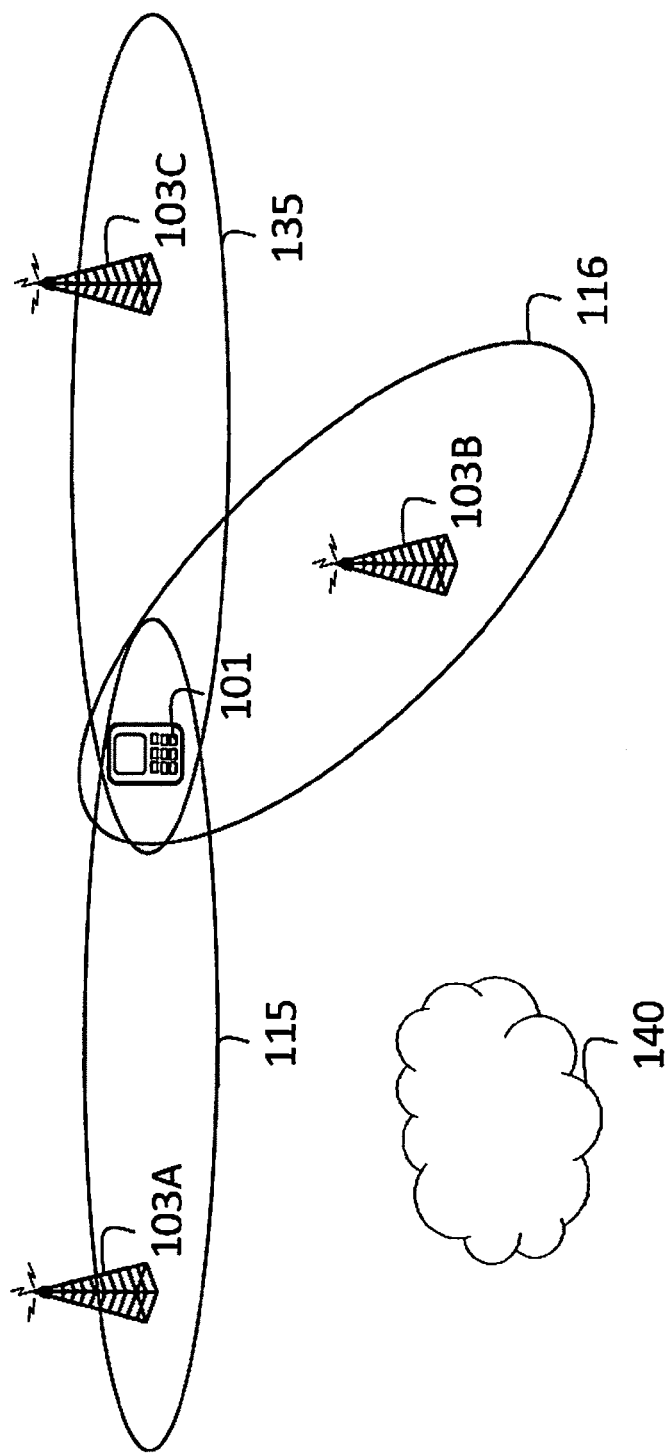
FIG. 1 is an illustrative example of a positioning measurement configuration.

FIG. 1 illustrates a positioning measurement configuration. As shown in FIG. 1, a user equipment 101 may perform positioning measurement configurations with respect to different cells 115, 116 and 135. Any number of base stations 103A, 103B and 103C may be utilized in the positioning measurement configurations. The decision of which positioning method that is selected, what type of positioning measurement configuration that is to be performed, what measurement configuration that shall be used and in which manner the measurements are performed, may be provided by a positioning node 140. Currently, there is no means for dynamically reconfiguring a positioning method or positioning measurement configuration based on radio channel related information. Specifically, if there is a more suitable positioning measurement configuration than a configuration which is currently being performed, this situation will only be discovered after the current configuration has been completed. As such, system resources may be wasted as unnecessary measurements may be performed.

Thus, example embodiments presented herein are directed towards the use of radio channel related information in positioning methods. Such information may be used to adjust and/or provide positioning measurement configurations with a more efficient use of system resources. Furthermore, such radio channel related information may also be used to improve the accuracy and efficacy over all. Example embodiments are presented herein which utilize radio channel related information in the use of positioning measurements and estimation, in particular within the field of fingerprinting positioning.

The remainder of the written description is arranged as follows. First, in order to thoroughly explain the example embodiments herein, the current state of the art and problems therewith will first be identified and discussed in greater detail. The discussion relating to the current state of the art comprises an analysis of different positioning methods in the sub-heading entitled 'Positioning Methods'. Thereafter, an explanation of the types of information which may be utilized in the positioning measurements is provided in the section entitled 'Radio Measurements'. An introduction of LTE positioning architecture is provided in the section entitled 'Positioning Architecture and Protocols in LTE' where an analysis of the problems in current systems and an overview of the example embodiments are provided.

In the section entitled 'Radio Channel Related Information' an explanation is provided on information which may be used in positioning methods, according to the example embodiments, in addition to the information relied upon in current system (as explained in the section entitled 'Radio Measurements'). Thereafter, examples of how the radio channel related information may be used when performing positioning measurements, or in the maintaining of positioning measurement data, is provided in the section entitled 'Using the Radio Channel Related Information'. Examples of how the radio channel related information may be obtained and used to optimize system configurations is provided in the sub-headings 'Methods of Optimizing Signal Transmissions' and 'Methods and Signalling means for Obtaining the Radio Channel Related Information'. Finally, an example of a node and operations that may be performed by the node are provided in the sections 'Example Node Configuration' and 'Example Node Operations', respectively.

Positioning Methods

Cell ID Positioning

All cellular systems may be divided into cells, served by one specific base station. Each base station may serve more than one cell. The important point from a positioning and navigation perspective is that the cell where a specific user equipment is located, is known in the cellular system. Hence, after determination of the geographical area covered by a specific cell, it may be stated that the user equipment is located somewhere within the geographical area of the cell, as long as it is connected and the reported cell identity of the serving cell is equal to the cell identity of the particular geographical area.

In several systems, the representation of the geographical extension of the cell which is often used is given by the cell polygon format. The extension of a cell is described by 3 to 15 corners of a closed polygon which does not intersect itself. The format is two-dimensional and the corners are determined as pairs of longitudes and latitudes in, for example, the WGS84 geographical reference system. The cell polygon format is discussed in detail in the Positioning result subsection.

Although the accuracy of the method is limited by the cell range, its main advantages are a very low response time as well as the fact that the method does not have an impact on the user equipment, it is easy to implement, it is widely spread and always available where there is cellular coverage. To exploit these advantages and enhance the CID technique, the accuracy of CID is further improved in E-CID method.

Enhanced Cell Identity

Enhanced CID (E-CID) methods exploit four sources of position information: the CID and the corresponding geographical description of the serving cell, the Timing Advance (TA) of the serving cell, the CIDs and the corresponding signal measurements of the cells (up to 32 cells in LTE, comprising the serving cell), as well as AoA measurements.

The following techniques are commonly used for E-CID: (1) CID+TA, which may utilize the geographical cell description, the eNodeB position, and the distance between the eNodeB and the user equipment obtained from a time measurement, where the timing measurement is, for example, TA in LTE; (2) signal strength, which may utilize distance measurements that may be derived from signal strengths measured in the user equipment and combined with cell polygons as for CID and TA; and (3) AoA which defines the angle of a user equipment with respect to a reference direction, which may be the geographical North direction.

The following user equipment measurements may potentially be utilized for E-CID in LTE: E-UTRA carrier Received Signal Strength Indicator (RSSI), Reference Signal Received Power (RSRP), Reference Signal Received Quality (RSRQ), and/oruser equipment Rx-Tx time difference. The E-UTRAN measurements available for E-CID are, for example, eNodeB Rx-Tx time difference (also called TA Type 2), TA Type 1 being (eNodeB Rx-Tx time difference)+(UE Rx-Tx time difference), and UL AoA. There may also be other measurements in the future (e.g., path loss, etc.), and the measurements may not be limited to intra-frequency measurements, and may also comprise inter-frequency measurements, inter-RAT measurements, or measurements on other carriers in a carrier aggregation system.

The measurements may be delivered to the positioning node via LPP, LPPa, LPPe or other protocols. Furthermore, when the positioning functionality resides in a radio network node (e.g., RNC in UMTS or eNodeB in LTE), measurements that are utilized for positioning may have been collected for other purposes.

CID+TA Positioning

Figure 2:
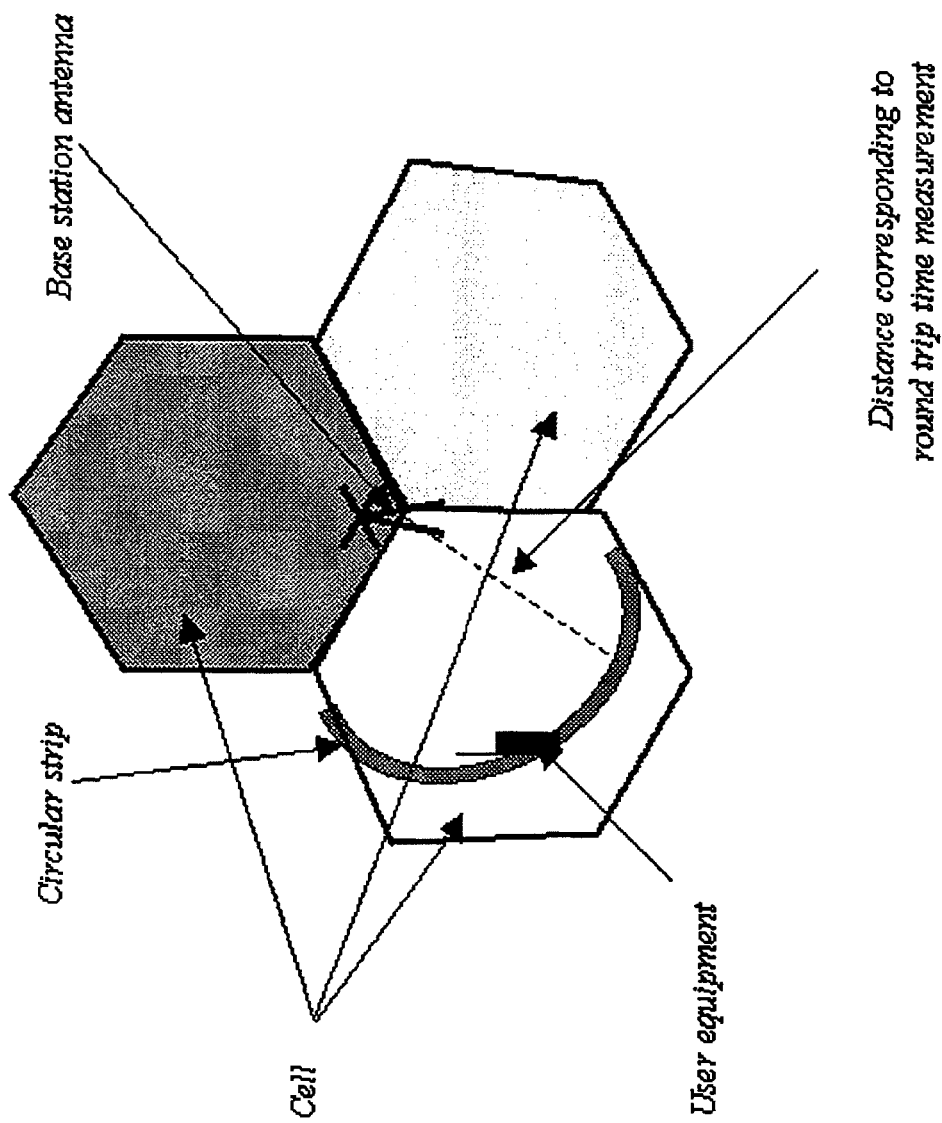
FIG. 2 is an illustrative example of a combined polygon cell extension model where a distance measure obtained from a timing advance measurement may be used to determine the user equipment location.

Cell ID augmented with Timing Advance (TA) measurements is one of the basic and important E-CID variants. This principle for enhanced cell identity positioning aims at combining the cell extension model (the polygon) with a distance measure. The TA measurement principle measures the round trip time and is depicted in FIG. 2. Briefly, the travel time of radio waves from the eNodeB to the user equipment and back is measured. The distance from eNodeB to user equipment then follows from the formula $$r = c\frac{TA}{2},$$

where TA is the timing advance and c is the speed of light. The timing advance measurement alone defines a circle, or if the inaccuracy is accounted for, a circular strip around the RBS. By combining this information with the cell polygon, left and right angles of the circular strip may be computed.

TDOA-/TOA-Based Methods (e.g. OTDOA, UTDOA or GNSS/A-GNSS)

OTDOA is a method based on time difference measurements conducted on DL positioning reference signals received from multiple locations, where the user location is further calculated by multi-alteration. UTDOA, an UL version of OTDOA, is a method that exploits UL time of arrival or time difference of arrival measurements performed at multiple receiving points. The UTDOA measurements are to be based on Sounding Reference Signals (SRS). A-GNSS/GNSS is a group of methods using satellite signal measurements, where the US GPS and the European Galileo are some examples of GNSS systems.

Time Difference of Arrival Positioning

The downlink observed time difference of arrival (OTDOA) method may utilize measurements, typically on some pilot radio signal, from multiple base stations. The measurement may be performed by means of correlation with the known signals of the base stations measured upon. The situation is depicted in FIG. 3.

Figure 3:
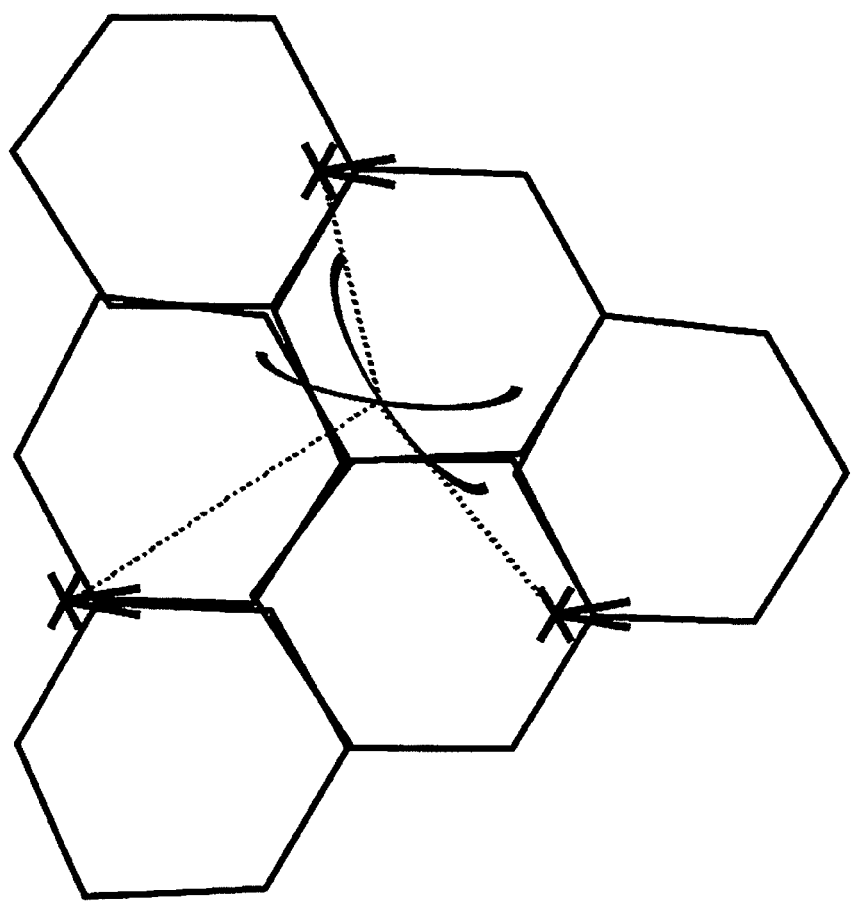
FIG. 3 is an illustrative example of an Observed Time Difference of Arrival (OTDOA) positioning method.

Assuming that the measurements are successful for a number of cells, three of which are depicted in FIG. 3, the following relations between the measured TOAs in the terminal, the transmission times from the base stations (eNodeBs in LTE) and the distances between the terminals and the base stations follow:

$$t_{TOA,1} + b_{clock} = T_1 + \|r_1 - r_{Terminal}\|/c$$
$$\vdots$$
$$t_{TOA,n} + b_{clock} = T_n + \|r_n - r_{Terminal}\|/c.$$

Here $t_{TOA,i}$, $i=1, \ldots, n$ denotes the measured time of arrivals (TOAs) in the terminal, $T_i$, $i=1, \ldots, n$ denotes the transmission times from the eNodeBs and c is the speed of light. The boldface quantities are the (vector) locations of the base stations and the terminal. $b_{clock}$ denotes the unknown clock bias of the terminal with respect to cellular system time. Now, in TDOA positioning, time of arrival differences with respect to a site are formed according to:

$$t_{TDOA,2} = t_{TOA,2} - t_{TOA,1} = T_2 - T_1 + \|r_2 - r_{Terminal}\|/c - \|r_1 - r_{Terminal}\|/c$$
$$\vdots$$
$$t_{TDOA,n} = t_{TOA,n} - t_{TOA,1} = T_n - T_1 + \|r_n - r_{Terminal}\|/c - \|r_1 - r_{Terminal}\|/c.$$

In these n−1 equations, the left hand sides are known (with some additional measurement error), provided that the time of transmission differences (denoted the real time differences) may be measured. This is normally achieved with dedicated hardware so called location measurement units (LMUs) or by other procedures. Furthermore, the locations of the base stations, $r_i$, $i=1, \ldots, n$, can be surveyed to within a few meters and so they are known as well. What remains unknown is the terminal location, for example:

$$r_{Terminal} = (x_{Terminal} y_{Terminal} z_{Terminal})^T.$$

In a more common case a two dimensional positioning is performed to determine the unknown position is instead:

$$r_{Terminal} = (x_{Terminal} y_{Terminal})^T.$$

It then follows that at least three time of arrival differences are needed in order to find a 3D terminal position and that at least two time of arrival differences are needed in order to find a 2D terminal position. This, in turn, means that at least four sites may be needed to detect 3D terminal positioning and at least three sites may be needed to detect 2D terminal positioning. In practice, accuracy can be improved if more measurements are collected and a maximum likelihood solution is introduced. There may also be multiple (false) solutions in cases where only a minimum number of sites are detected.

The OTDOA method belongs to the set of high precision methods, the inaccuracy is however significantly larger than that of A-GPS. The main advantage of OTDOA is that it provides high precision positioning also indoors, a situation where the availability of A-GPS is very limited. Some of the example embodiments presented herein may use of the uplink time difference of arrival method. It is based on measurement of the time of arrival in the RBSs of signals (including traffic and data) that is sent from the user equipment. In such methods, it is beneficial that positioning node keep an accurate track of the timing of each eNodeB.

A-GPS Positioning

Figure 4:
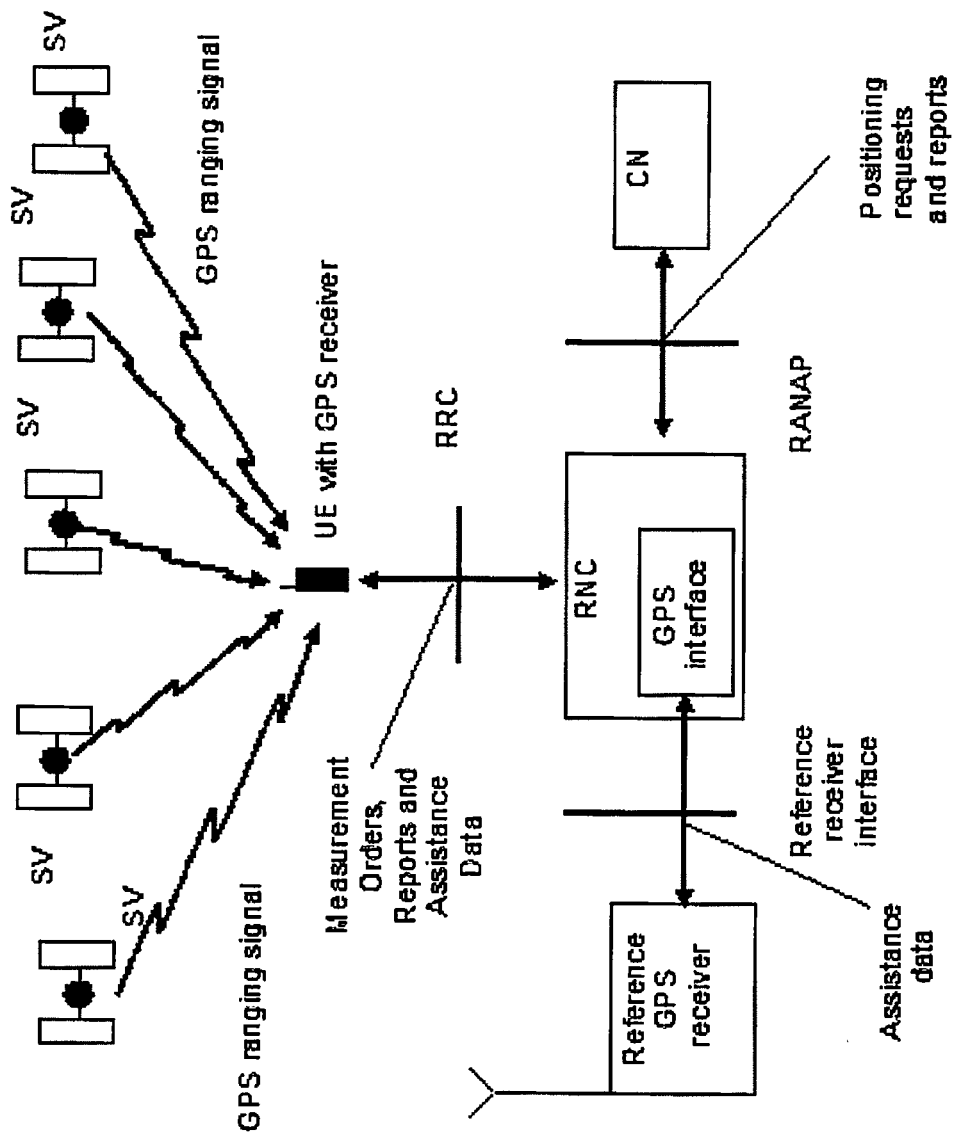
FIG. 4 is an illustration of an Assisted Global Positioning System (A-GPS) implemented in a cellular communication system.

Assisted GPS (A-GPS) positioning is an enhancement of the global positioning system (GPS). An example of an A-GPS positioning system is displayed in FIG. 4. There GPS reference receivers attached to a cellular communication system collect assistance data that, when transmitted to GPS receivers in terminals connected to the cellular communication system, may enhance the performance of the GPS terminal receivers. Typically, A-GPS accuracy can become as good as 10 meters also without differential operation. The accuracy becomes worse indoors and in dense urban areas, where the sensitivity is most often not high enough for detection of very weak signals from the GPS satellites.

More general A-GNSS positioning methods are also supported in LTE for user equipments that are equipped with radio receivers capable of receiving GNSS signals. Examples of GNSS include GPS, Modernized GPS, Galileo, Global Navigation Satellite System (GLONASS), Space Based Augmentation Systems (SBAS), and Quasi Zenith Satellite System (QZSS).

Fingerprinting Positioning

Another positioning approach is provided by so called fingerprinting positioning. Fingerprinting positioning exploits received downlink and/or uplink measurements, together with the corresponding cell identities, to map onto a geographical map of the radio properties. The maps may be obtained by extensive site surveying or radio signal strength software. This method provides an accuracy somewhere in between the high precision positioning methods and the enhanced cell ID methods.

Fingerprinting positioning methods operate by creating a radio fingerprint for each point of a fine coordinate grid that covers the RAN. Fingerprinting methods are not typically standardized and rely on measurements collected e.g. for E-CID, OTDOA, etc., or even measurements originally collected for purposes other than positioning.

In LTE the fingerprint may comprise, for example (1) the cell IDs that are detected by the terminal, in each grid point; (2) quantized path loss or signal strength measurements, with respect to multiple eNodeBs, performed by the terminal, in each grid point (it should be noted that an associated ID of the eNodeB may also be needed); (3) a quantized TA, in each grid point (it should be noted that an associated ID of the eNodeB may also be needed); and/or (4) angle of arrival (AoA) measurements performed in one or several eNodeBs.

Whenever a position request arrives to the positioning method, a radio fingerprint is first measured, after which the corresponding grid point is looked up and reported. This of course requires that the point is unique. The database of fingerprinted positions (the radio map) can be generated in several ways. A first alternative would be to perform an extensive surveying operation that performs fingerprinting radio measurements repeatedly for all coordinate grid points of the RAN. The disadvantages of this approach include: (1) the surveying required becomes substantial also for small cellular networks; and (2) the radio fingerprints are in some instants (e.g., signal strength) sensitive to the orientation of the terminal, a fact that is particularly troublesome for handheld terminals. For fine grids, the accuracies of the fingerprinted positions therefore become highly uncertain. This is unfortunately seldom reflected in the accuracy of the reported geographical result.

Another approach is to replace the fine grid by high precision position measurements of opportunity, and to provide fingerprinting radio measurements for said points. This avoids the above drawbacks, however, methods for clustering of high precision position measurements of opportunity needs to be defined. Furthermore, methods for computation of geographical descriptions of the clusters need to be defined.

Recently, an iAECID variant of AECID has been developed. In that method, centroids are used for positioning rather than polygons which may be described, e.g., with an ellipsoid point format. The example embodiments presented herein are equally valid for AECID and iAECID, and also for other fingerprinting methods or methods used as a means for collecting measurements for fingerprinting positioning methods (e.g., E-CID in LTE).

Radio Measurements

Some of the positioning measurements described above and the example embodiments described herein utilize radio measurements. Brief examples of such radio measurements are provided below.

Radio Signal Strength and Quality Measurements

Power-based radio signal measurements such as signal strength or quality may be used for positioning to derive the distance, e.g., based on the pathloss estimation, or as RF fingerprints. These measurements may be performed by the user equipment or radio nodes.

Timing Measurements

Example timing measurements are time of arrival, round trip time, time difference of arrival, Rx-Tx, and timing advance. Timing measurements in general allows for obtaining better accuracy in distance information compared to distance estimations based on radio signal strength/pathloss measurements due to the fading fluctuations of the latter. Timing measurements are commonly used for positioning, although they may serve more general network purposes as well. Timing measurements may be performed by user equipment or the radio node or both. The latter alternative applies for two-directional measurements such as RTT.

AoA Measurement

The angle of arrival (AoA) measurement standardized for LTE is defined as the estimated angle of a user equipment with respect to a reference direction which is the geographical north, positive in the clockwise direction. This measurement may be performed by the base station or user equipment.

Delay Spread

Radio propagation may be thought of as rays of radiation emitted from the transmit antenna. These rays propagate in straight lines in various directions and with various powers (as manifested by the antenna diagram). When obstacles are encountered the rays are scattered. The rays that arrive at the antenna therefore have traveled different ways and are impinging on the receiver antenna(s) from different directions. Since the traveled distance is not equal among rays, i.e., multipath propagation persists, the rays also arrive at different times. In this way the response to a transmission of a pulse is spread out in time. This spreading in time is usually denoted delay spread. It may be measured and defined in many ways; however, for this discussion it is important to understand that a high delay spread is an indication of much multi-path propagation, and radiation that impinges on the receiver antenna(s) from different directions.

Doppler

The Doppler spectrum caused by the Doppler effect is a consequence of the user equipment moving. To understand its effect on positioning it is necessary to understand that a radio signal fades. So called fast fading is a result of the random addition of radio waves impinging at the receiver antenna from different directions. This may be thought of as generating a power variation that is a function of the user equipment location. Typically, the fading power correlation distance is a fraction of the carrier wavelength and it is relatively stationary in space. Standard radio propagation calculations show that such fast fading sometimes follows a Rayleigh distribution.

As compared to a stationary user equipment, the moving user equipment experiences a movement in this power fading field. This manifests itself as a variation of the received power (unless fast power control is applied), causing a corresponding random variation of the received power. This is commonly modeled by a Doppler spectrum.

Typically, very fast movements cause a so fast variation that averaging over a radio frame may reduce the effect of fading. Very slow movement may also normally be handled by slow power control. Intermediate movement is sometimes more difficult.

The Doppler typically affects positioning measurement by sometimes making power-based measurements inaccurate. Furthermore, Doppler also affects positioning by making the SNR too poor for other measurements that are performed with little time integration, thereby causing a reduced inaccuracy.

Positioning Architecture and Protocols in LTE

The three key network elements in an LTE positioning architecture are the Location Services (LCS) Client, the LCS target and the LCS Server. The LCS Server is a physical or logical entity managing positioning for a LCS target device by collecting measurements and other location information, assisting the user equipment in measurements when necessary, and estimating the LCS target location. A LCS Client is a software and/or hardware entity that interacts with a LCS Server for the purpose of obtaining location information for one or more LCS targets, i.e., the entities being positioned. LCS Client may reside in a network node, in radio node or in a user equipment. LCS Clients may also reside in the LCS targets. An LCS Client sends a request to LCS Server to obtain location information, and LCS Server processes and serves the received requests and sends the positioning result and optionally a velocity estimate to the LCS Client. A positioning request can be originated from the user equipment or the network.

DL Positioning

Two positioning protocols operating via the radio network exist in LTE, LTE Positioning Protocol (LPP) and LTE Positioning Protocol A (LPPa). The LPP is a point-to-point protocol between a LCS Server and a LCS target device, used in order to position the target device. LPP can be used both in the user and control plane, and multiple LPP procedures are allowed in series and/or in parallel thereby reducing latency. LPPa is a protocol between base station and LCS Server specified only for control-plane positioning procedures, although it still can assist user-plane positioning by querying base stations for information and base station measurements. Secure User Plane Location (SUPL) protocols may be used as a transport for LPP in the user plane. In the user plane with SUPL, a user equipment is typically referred to as SUPL Enabled Terminal (SET), the LCS platform is typically referred to as SUPL Location Platform (SLP). An LPP extension LPPe is also defined by the Open Mobile Alliance (OMA) and may be used to extend the LPP signaling, e.g. to provide more extended position reports or provide assistance data, e.g., to better support measurement of a certain method or to support more methods and Radio Access Technologies (RATs). Other extensions may potentially be supported by LPP in the future.

Figure 5:
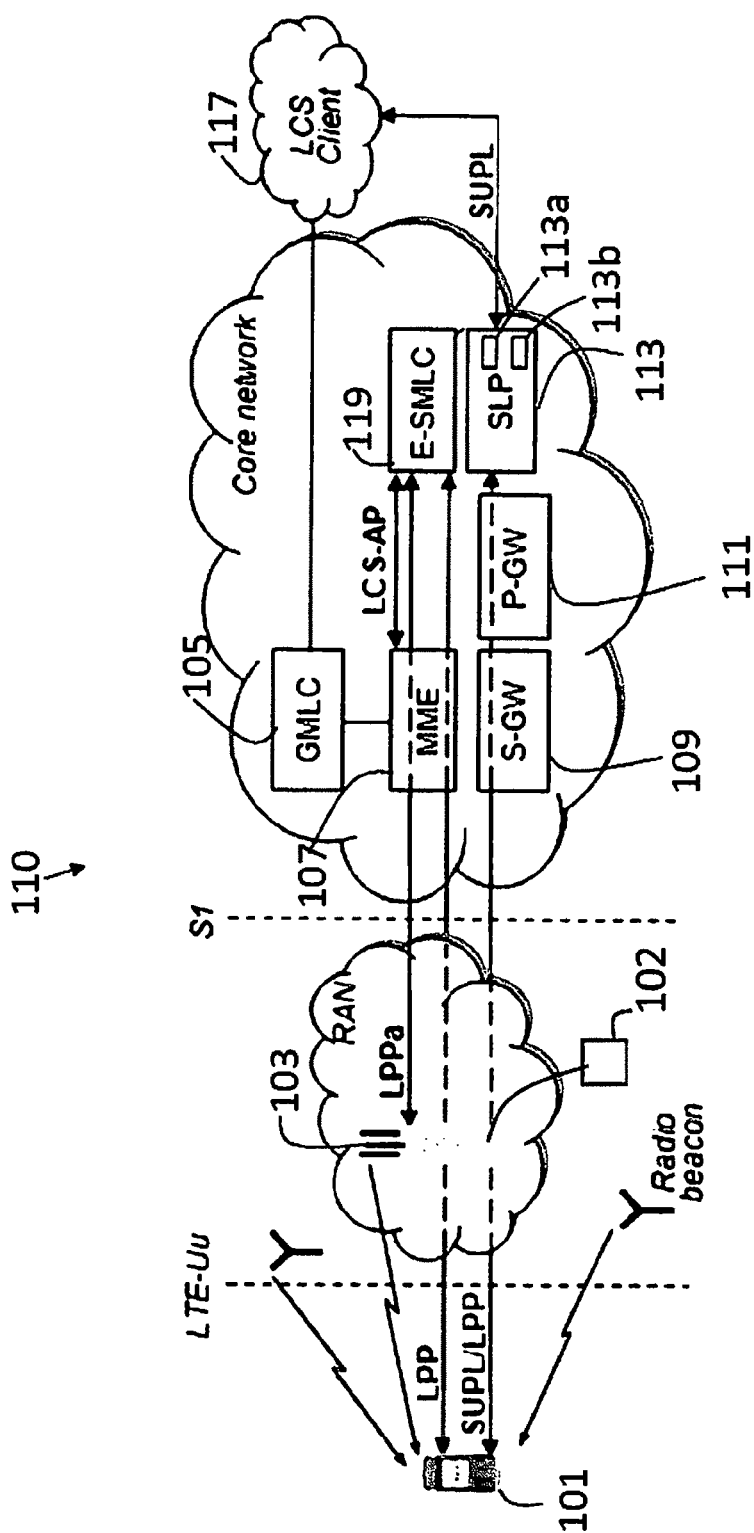
FIGS. 5 and 6 are illustrative examples of LTE positioning architecture.

FIG. 5 illustrates positioning architecture in an LTE system. The positioning architecture may comprise a user equipment 101 which may be configured to perform positioning measurements. The user equipment 101 may be in communication with a base station 103. The base station 103 may be in communication with a core network comprising a Serving Gateway (SGW) 109, a Packet Data Network Gateway (PGW) 111 and a Mobility Management Entity (MME) 107. The base station 103 may also be in communication with a Location Measurement Unit (LMU) 102 which may assist in performing measurements. The core network may also comprise a number of nodes with positioning functionality, for example, a Gateway Mobile Location Centre (GMLC) 105, an Enhanced Serving Mobile Location Centre (E-SMLC, control-plane positioning node) 115 and/or a Secure User Plane Location Platform (SLP, user-plane positioning node) 113. SLP 113 may comprise two components, SPC 113b and SLC 113a, which may also reside in different nodes. In an example implementation, SPC 113b has a proprietary interface with E-SMLC 119, and Llp interface with SLC 113a, and the SLC part of SLP 113 communicates with P-GW (PDN-Gateway) and External LCS Client.

The GMLC 105 may be used to request routing information from the HLR (Home Location register) or HSS (Home Subscriber Server). The GMLC 105 may also be used to send positioning requests to either the VMSC (Visited Mobile Switching Centre), SGSN (Serving GPRS Support Node) or MSC (Mobile Switching Centre) Server or MME and receive final location estimates from the corresponding entity. The E-SMLC 115 may communicate with the user equipment 101 for location services and assistance data delivery using an LPP protocol. The E-SMLC 115 may also communication with the base station 103 of assistance data purposes using an LPPa protocol. The SLP 113 may be responsible for coordination and administrative functions to provide location services. The SLP 113 may also be responsible for positioning functions. The SLP 113 is a positioning node in the user plane.

Additional positioning architecture elements may also be deployed to further enhance performance of specific positioning methods. For example, deploying radio beacons is a cost-efficient solution which may significantly improve positioning performance indoors and also outdoors by allowing more accurate positioning, for example, with proximity location techniques. The described protocols are so far defined to support mainly DL positioning.

UL Positioning

Figure 6:
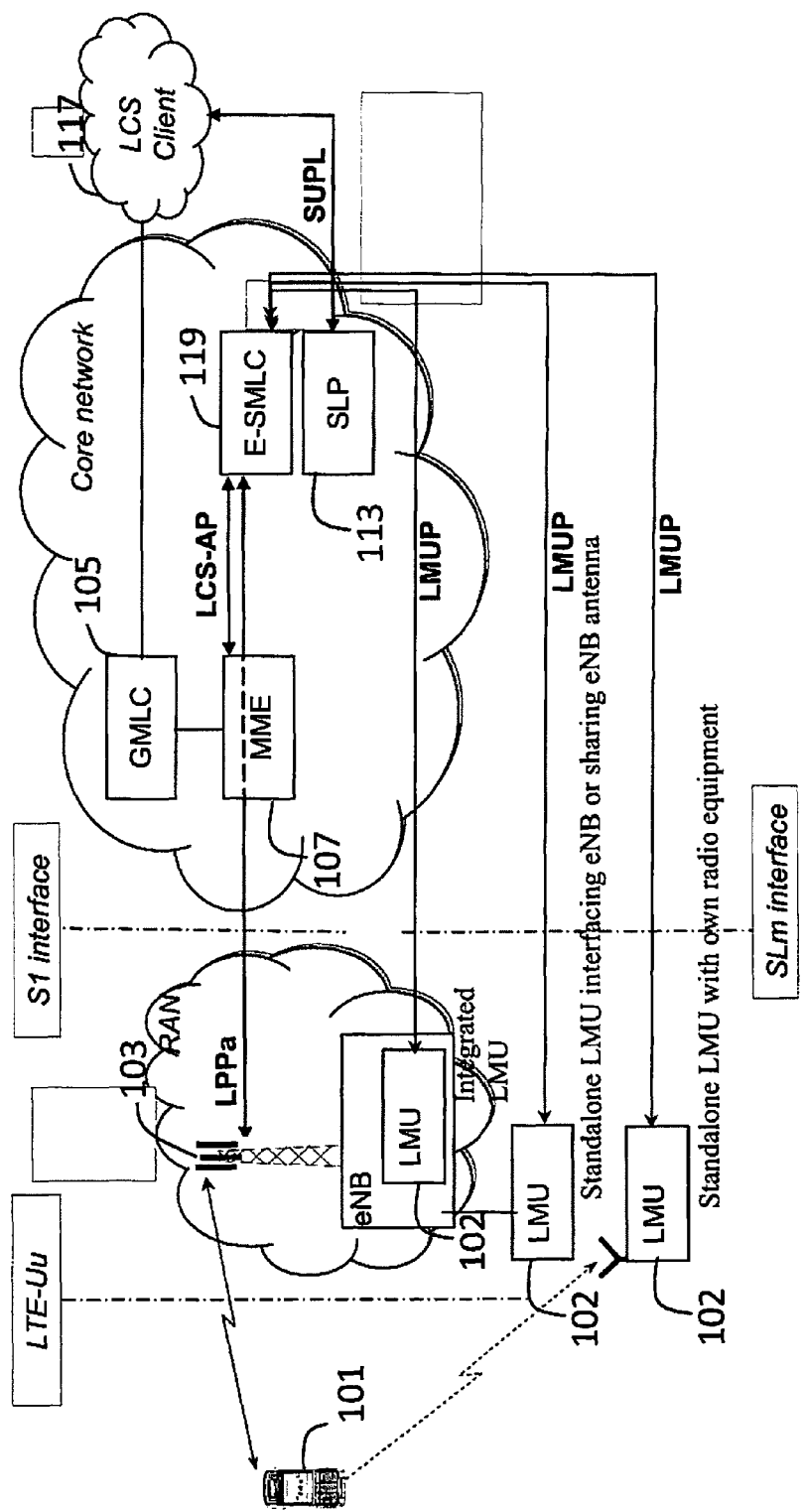

The architecture for UL positioning, or network-based positioning, is currently being discussed in 3GPP at a high level, i.e., without many details. An example of the possible architecture is shown in FIG. 6. It is assumed that UTDOA measurements are being performed by LMUs, though measurements by base stations are not precluded, and the measurements are based on Sounding Reference Signals (SRS). The following three approaches for communications between positioning node and LMU are currently being discussed: (1) LPPa-based for both base station-integrated and standalone LMUs, (2) transparent overlay for both base station-integrated and standalone LMUs using a new interface (transparent to base station; the interface may be called "SLm") between E-SMLC and LMUs, and (3) a hybrid LPPa-based approach for base station-integrated LMUs and transparent overlay for standalone LMUs. Independently of the three approaches, LPPa is likely to be enhanced for communications between base station and E-SMLC necessary to support UTDOA (e.g., related to configuring SRS to enable UTDOA measurements). LMUs may be integrated in radio network nodes or may be standalone. Furthermore, LMUs may or may not share the radio equipment (e.g., an antenna) with other network nodes. There may also be other radio nodes with similar capability, e.g., eNodeBs may also have the functionality for performing UL measurements.

Positioning Result

A positioning or measurement result is a result of processing of obtained measurements, including Cell IDs, power levels, received signal strengths, etc., and it may be exchanged among nodes in one of the pre-defined formats. The signaled positioning or measurement result is represented in a pre-defined format corresponding to one of the seven Geographical Area Description (GAD) shapes.

The positioning result may be signaled between: (1) the LCS target and LCS server, e.g., over LPP protocol; (2) positioning servers (e.g., E-SMLC and SLP), over standardized or proprietary interfaces; (3) positioning server and other network nodes (e.g., E-SMLC and MME/MSC/GMLC/O&M/SON); and (4) positioning node and LCS Client (e.g., between E-SMLC and PSAP or between SLP and External LCS Client or between E-SMLC and user equipment).

The Polygon Format

Figure 7:
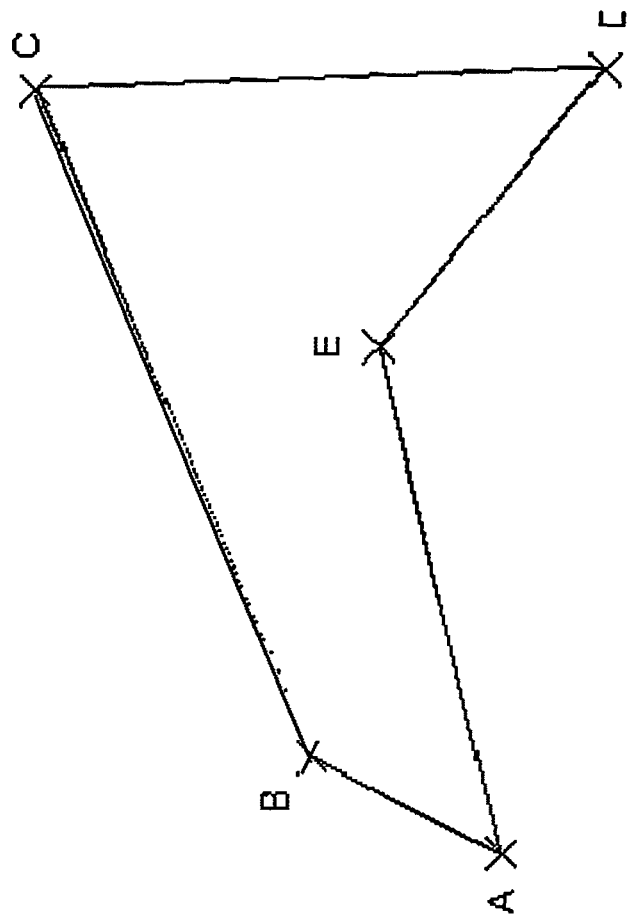
FIG. 7 is a geometrical representation of the geographical extension of the cell.

As stated above, the representation of the geographical extension of the cell which is most commonly used is the cell polygon format. The extension of a cell is described by 3-15 corners of a closed polygon which does not intersect itself, cf. FIG. 7. The format is two-dimensional and the corners are determined as pairs of longitudes and latitudes in the WGS84 geographical reference system. The exact messaging format in 3GPP is illustrated in the table below.

| 8 | 7 | 6 | 5 | 4 | 3 | 2 | 1 | |
|---|---|---|---|---|---|---|---|---|
| 0 | 1 | 0 | 1 | Number of points | | | | Octet 1 |
| S1 | | | | | | | | Octet 2 |
| | | | Degrees of latitude of point 1 | | | | | Octet 3 |

| 8 | 7 | 6 | 5 | 4 | 3 | 2 | 1 | |
|---|---|---|---|---|---|---|---|---|
| | | | | | | | | Octet 4 |
| | | | | | | | | Octet 5 |
| | | Degrees of longitude of point 1 | | | | | | Octet 6 |
| | | | | | | | | Octet 7 |
| Sn | | | | | | | | Octet 6n − 4 |
| | | Degrees of latitude of point n | | | | | | Octet 6n − 3 |
| | | | | | | | | Octet 6n − 2 |
| | | | | | | | | Octet 6n − 1 |
| | | Degrees of longitude of pont n | | | | | | Octet 6n |
| | | | | | | | | Octet 6n + 1 |

In UMTS, the corresponding Information Element (IE) is present in the LOCATION REPORT message that is returned from the RNC to the core network over the RANAP interface after a successful cell identity positioning. In LTE, when NI-LR is used, the location report would be returned to MME from the positioning server (e.g., E-SMLC in the control plane or SLP in the user plane, where the location center of the SLP may e.g. be integrated with E-SMLC or attached to with a proprietary interface) and then sent to the LCS Client. It should be noted that due to the complexity of the radio propagation, the cell polygon format may only be an approximation of the extension of the true cell. The selection of the polygon format is dictated by the need to have a reasonably flexible geographical representation format, taking e.g. computation complexities and reporting bandwidths into account. Since the polygon format approximates the cell extension, the polygon is normally pre-determined in the cell-planning tool to represent the cell extension with a certain confidence. The confidence is the probability that the terminal is actually located within the reported region, in this case bounded by the cell polygon.

Other Position Reporting Formats

In this section six other formats based on GAD shapes are described. These formats and the polygon format are used for position reporting in 3GPP networks (as well as other formats know in the art). In cdma2000, the location is reported following the WGS-84 reference ellipsoid format. Specifically, an ellipsoid point, optionally with an uncertainty circle or uncertainty ellipse, associated with one of the pre-defined confidence levels. The WGS-84 is also the reporting format for 802.x wireless networks (e.g., 802.11 or 802.16).

The ellipsoid arc is described by a center point (eNodeB antenna position), encoded as latitude, longitude in WGS 84 co-ordinates. Furthermore, the format contains an inner radius of the arc, a thickness of the arc as well as the offset angle (clockwise from north) and the included angle (opening angle). Together, these parameters define a circular sector, with a thickness and with left and right angles. The ellipsoid arc does carry confidence information. This format is, for example, produced by cell ID+TA positioning in LTE.

The ellipsoid point format is described by a center point, encoded as latitude, longitude in WGS 84 co-ordinates. The format neither carries uncertainty, nor confidence information. The ellipsoid point with uncertainty circle format consists of a center point, encoded as latitude, longitude in WGS-84 co-ordinates, in combination with a radial uncertainty radius. The format does not carry confidence information. This is addressed by some of the example embodiments presented herein.

The ellipsoid point with uncertainty ellipse format consists of a center point, encoded as latitude, longitude in WGS-84 co-ordinates. The uncertainty ellipse is encoded as a semi-major axis, a semi-minor axis and an angle relative to north, counted clockwise from the semi-major axis. The format carries confidence information. This format is typically produced by OTDOA and A-GPS positioning in LTE. The ellipsoid point with altitude format is encoded as an ellipsoid point, together with an encoded altitude. The format neither carries uncertainty, nor confidence information.

The ellipsoid point with altitude and uncertainty ellipsoid is the format commonly received from A-GPS capable terminals. It comprises an ellipsoid point with altitude and an uncertainty ellipsoid, the latter encoded with a semi-major axis, a semi-minor axis, an angle relative to north, counted clockwise from the semi-major axis, together with an uncertainty altitude. The format carries confidence information. This format is typically produced by A-GPS positioning in LTE.

Shape Conversion

Even though some formats may be more specific for some methods, shape conversion may be used to transform a positioning result from one format (shape) to another one.

Overview of Example Embodiments

At least the following problems exist with current fingerprinting technology. First, there is no signaling of radio channel related information over the positioning protocols of LTE, WCDMA and GSM. Such radio channel related information may comprise measured Doppler information of a user equipment or a measure of the user equipment speed, and/or the measured delay spread of a user equipment. The information may be obtained or measured by the UE or base station, both referred to as a radio node. Furthermore, there are no current fingerprinting methods that utilize radio channel related information, in positioning nodes of LTE, WCDMA and GSM. The lack of such methods may have the following consequences, for example: (1) a lack of accuracy enhancement due to distinguishing regions with different delay spread (e.g., low countryside, high metropolis areas); (2) a lack of accuracy enhancement due to distinguishing regions with different Doppler (e.g. freeways, high, residential areas, low); and (3) a lack of mechanisms to differentiate positioning measurements based on the user equipment speed and using the user equipment speed related information for positioning.

Thus, the example embodiments presented herein may be utilized to introduce the signaling of radio channel related and speed-related information over the positioning interfaces of LTE, WCDMA and GSM, thereby allowing fingerprinting positioning methods (for example Ericsson's AECID and iAECID methods) to exploit such information to enhance positioning accuracy.

Radio Channel Related Information

According to the example embodiments, radio channel related information comprises any one or any combination of delay spread information, Doppler information, multi-path related information and/or speed information, which are further described in the respective sub-sections below. The information may be associated with a frequency, frequency band or RAT. It may also be associated with a bandwidth (e.g., system bandwidth, a measurement bandwidth or a serving cell bandwidth). The information is not limited to being associated with a serving cell only, but may be associated with one or more neighbour cells or secondary cells (SCells in a carrier aggregation system). Furthermore, the information may be derived or comprise measurements performed as intra-frequency measurements, inter-frequency measurements, inter-RAT measurements, or measurements on any component carrier of a multi-carrier or carrier aggregation system. The measurements may be performed based on DL or UL physical signals (e.g. in LTE: CRS, synchronization signals, Sounding Reference Signals, Positioning Reference Signals, other reference signals, etc.) and/or channels (e.g., RACH). The measurements may also be performed by any radio node in the network, e.g., user equipment or eNodeB.

Delay Spread Information

The delay spread information is the information related to the amount of multi-path between at least one transmitter and one receiver. In the example embodiments presented herein, it may be provided in a number of ways. Thus, the delay spread information may be used as a part of the fingerprint in fingerprinting positioning and in AECID, and may be exploited, for example, for making freeways and fast terminal movement or used to distinguish indoor from outdoor environments. The delay spread information may be provided with respect to a reference transmitter or receiver, which, in some of the example embodiments, may be associated with a serving or primary cell. According to some of the example embodiments, the delay spread information may be provided with respect to a reference measure. The relative measures may be the differences or the ratios, and may be, e.g., in linear or logarithmic scale.

Furthermore, the delay spread information may be obtained for multiple transmitters and/or multiple receivers. Some examples of a transmitter are a user equipment (e.g., for UL positioning) and a radio node (e.g., for DL positioning). Some examples of a receiver are a radio node (e.g., for UL positioning) and a user equipment (e.g., for DL positioning). Distributed multiple transmit and/or receive antennas may be considered as multiple transmitters or receivers, respectively. Without limiting the scope of the example embodiments, the delay spread information may be obtained for any cell or any transmit and/or receive node, which may or may not create its own cell.

The delay spread information may be used to evaluate the amount of multi-path and non-line of sight (non-LOS) radio propagation, e.g., by comparing to a threshold. The delay spread information may also comprise a measure characterized by one of the pre-defined levels or indicators, e.g., "high"/"low" or provided as an environment characteristic, e.g., "rich multi-path environment", etc. One benefit with the delay spread information is that application of AoA based positioning methods can be controlled in a more efficient way. Another benefit is that delay spread information can be made a part of the fingerprint in fingerprinting positioning and AECID.

The delay spread measurements may be performed based on DL or UL physical signals (e.g. in LTE: CRS, synchronization signals, Sounding Reference Signals, Positioning Reference Signals, other reference signals, etc.) and/or channels (e.g., RACH). The measurements may be intra-frequency, inter-frequency, or inter-RAT. The delay spread information may also be aggregated (e.g. into one fingerprint) to reflect multiple cells.

Doppler Information and Speed Information

Doppler information describes the dominating frequency of the Doppler spectrum, e.g., by means of a Doppler shift. It typically depends on frequency and relative velocity of the transmitter and receiver. Thus, the Doppler information may be used as a part of the fingerprint in fingerprinting positioning and in AECID, and may be exploited, for example, for making freeways and fast terminal movement or used to distinguish indoor from outdoor environments.

The Doppler information may be provided with respect to a reference transmitter or receiver, which, in some of the example embodiments, may be associated with a serving or primary cell. According to some of the example embodiments, the Doppler information may be provided with respect to a reference measure. The relative measures may be differences or ratios, and may be, e.g., in linear or logarithmic scale.

Furthermore, the Doppler information may be obtained for multiple transmitters and/or multiple receivers. Some examples of a transmitter are a user equipment (e.g., for UL positioning) and a radio node (e.g., for DL positioning). Some examples of a receiver are a radio node (e.g., for UL positioning) and a user equipment (e.g., for DL positioning). Distributed multiple transmit and/or receive antennas may be considered as multiple transmitters or receivers, respectively. Without limiting the scope of the example embodiments, the Doppler information may be obtained for any cell or any transmit and/or receive node, which may or may not create its own cell.

The Doppler information may also be provided as one of the pre-defined levels or indicators, e.g., "high"/"medium"/"low" or provided as an environment characteristic, e.g., "high velocity", etc. Furthermore, speed information may also be provided, e.g., as a part of Doppler information or separately from it. The speed information may be derived using the Doppler measurements or may be known or available from other sources. One such source may be A-GPS measurements. The Doppler and/or speed information may be used to evaluate the accuracy of power measurements as well as other measurements that are not using long time integration, e.g., by comparing to a threshold, which may be a user programmable threshold. One example benefit with the Doppler and/or speed information is that the application of power based positioning methods can be controlled in a more efficient way. Another example benefit is that Doppler information can be made a part of the fingerprint in fingerprinting positioning and AECID.

The Doppler measurements may be performed based on DL or UL physical signals (e.g. in LTE: CRS, synchronization signals, Sounding Reference Signals, Positioning Reference Signals, other reference signals, etc.) and/or channels (e.g., RACH). The measurements may be intra-frequency, inter-frequency, or inter-RAT.

Using Radio Channel-Related Information for Positioning

The new measurements, new information and signaled quantities related to radio channel-related information described herein may be used for a number of purposes. One example purpose may be for enhancing fingerprinting positioning, for example, AECID or iAECID. Another example purpose may be for enhancing any one or more of other positioning methods, for example, E-CID, OTDOA, UTDOA, hybrid positioning, etc. Another example purpose for using such radio channel-related information may be as a complement to requested measurements that are native to any selected positioning method, for example, any fingerprinting or pattern matching positioning, OTDOA, UTDOA, E-CID, hybrid positioning. Furthermore, such information may be used for enhancing positioning method selection or reselection (e.g., proximity-like methods may be avoided when the information indicates fast movement). Another example use may be for selecting positioning assisting radio nodes, e.g., eNodeB or LMUs (e.g., radio nodes with a large coverage may be preferred when the information indicates fast movement; indoor nodes in the same building may be preferred when the information indicates that that the LCS target is likely indoors). A further example use may be for optimizing configuration of signals to be measured for a positioning method which has been selected or to be selected. Another example use may be for evaluation of potential accuracy or reliability of other measurements.

Using radio channel-related information in fingerprinting positioning may imply also the ability of managing the radio channel related information and storing it in a fingerprinting database.

Using Doppler Information and Speed Information

With fingerprinting or in particular AECID and iAECID positioning, power/pathloss measurements from several radio nodes may need to be combined. It is then well known that a high speed may impair the sharpness of the power information. The positioning node may then use this information for a number of reasons. One example reason may be for selecting the assisting nodes based on received Doppler information from the nodes. Similarly, from a set of nodes, the positioning node selects a subset of radio nodes, at least N best of which are used to set up fingerprinting or AECID based positioning. The Doppler information obtained by the positioning node concerns the user equipment to be positioned (transmitter) and the radio nodes (receivers), when UL is considered, of the other way around for DL. As an alternative, the power measurements from all assisting nodes can be statistically combined using Doppler information as a measurement accuracy indicator.

Doppler may be a part of the fingerprint in general and for AECID and iAECID in particular. One further example application may be using this information for differentiating indoor and outdoor environment. Another example application is differentiating the environment where the user equipment may be moving with a generally higher speed, for example, highways.

The Doppler and/or speed information may be used to evaluate the accuracy or reliability of other, e.g., power-based, measurements as well as other measurements that are not using long time integration, e.g., by comparing to a threshold. One example decision that a positioning node may make is to include the fingerprint or not in a fingerprint database or handle this fingerprint in a special way when the information indicates e.g. fast movement.

Using Delay Spread

With fingerprinting, or in particular AECID and iAECID positioning, delay spread information may be used as a part of the fingerprint. Furthermore, in principle, the applications of the delay spread information in a positioning node may be similar to that of the doppler and speed information.

Methods of Optimizing Signal Transmissions

Based on the radio channel-related information (Doppler, delay spread, or speed or any combination thereof), a network node (e.g., positioning node, radio node) in order to enhance positioning measurements may optimize signal transmissions. Such optimization may be provided in a number of ways. For example, a network node may optimize an antenna configuration (e.g., direction, beam width, etc.) for transmitting or receiving signals used for positioning measurements to reduce delay spread and better adapt in a multi-path rich radio propagation environment.

Methods and Signaling Means for Obtaining the Radio Channel-Related Information

Obtaining Radio Channel-Related Information by an Explicit Request

The radio channel-related information may be explicitly requested, e.g., by the positioning node or other node (e.g., SON, MDT, O&M node, gateway node or radio node). The request may be a part of the positioning method procedure or relate at least in time to it. The request may also relate to other positioning method (e.g., E-CID or RF fingerprinting) than the positioning method in relation to which the radio channel related information has been obtained, e.g., a baseline method request may implicitly trigger another-method request, where the request may also be requesting a specific measurement (e.g., a timing measurement). The other node (if not a positioning node but is e.g. a gateway node) may in turn also be requested by the positioning node. The request may be sent to a radio node (e.g., associated with the LCS target such as a serving base station or a measuring in UL radio node) or the LCS target or another node (e.g., a gateway node).

Some examples of the requested nodes may be nodes performing the measurement, for example, eNodeB, LMU, and a user equipment (in its general sense), or a node maintaining the related information and not performing the measurement itself, for example, serving eNodeB, a coordinating node (e.g., a master eNodeB or a gateway node).

The request may be sent, for example, prior to performing measurements specific to the positioning method, e.g., prior to sending the OTDOA assistance data or prior to deciding the set of cooperating LMUs with UTDOA or prior to deciding the positioning method. The request may also be sent in parallel with executing the positioning method to make the radio channel related information available in the positioning node prior to position calculation.

Depending on the requested node, the request may be sent via LPP or its extension such as LPPe or over extension, via LPPa or its extension or other similar protocol (e.g., between LMU and positioning node or between the LMU and the intermediate node), or via RRC. Upon receiving the request, the requested measurement may be provided by the requested node (e.g., via LPP, LPPe, LPPa, its extensions, RRC or similar protocols). The received radio channel measurement may serve as the complementary measurement when used to enhance the baseline method (e.g., when the measurement is delivered as a complement to OTDOA measurements, E-CID measurements, UTDOA measurements or measurements of any other non-fingerprinting positioning method).

Obtaining the Radio Channel-Related Information in an Unsolicited Way

Radio channel-related information may be provided without an explicit request. The action may also be triggered by another positioning-related message, for example, a request for certain measurements or message initiating a certain positioning method. In another example, the radio channel-related information may be provided in a message requesting assistance data (e.g., OTDOA assistance data). The nodes that may provide this information are as described in the sub-section above, any node performing at least one radio channel related measurement or any node maintaining the related information which may or may not be performing the radio channel related measurement itself.

Signaling of the Radio Channel-Related Information

According to some of the example embodiments, the radio channel-related measurement report may be signaled with the prior art signaling means, which may, however, require some changes in the behavior of at least one of the reporting and receiving nodes to ensure consistent interpretation of the information at both ends. For example, some unused information elements may be exploited for delivering the radio channel related information.

According to some of the example embodiments, the prior art signaling is enhanced by introducing new information elements for the radio channel related information. New methods and procedures may also be introduced. This may concern LPP, LPPe, LPPa, their extensions, RRC, or other protocol. Furthermore, the need for radio channel-related information may be indicated in a message transmitted to a node capable of delivering or triggering the delivery of this information. There may also be an indication for the availability of the radio channel-related information. There may also be a capability defined and indicated by signaling for a node to inform about whether the node is capable or not to manage and/or deliver the radio channel related information.

The radio channel related measurement information may be provided in a measurement report or other message. Some examples of other messages are a request for assistance data, positioning-related capability information, etc. The cell for which the radio channel-related measurement is provided may be a designated cell, e.g., indicated in a certain way or has a certain functionality (e.g., being a serving or a reference cell). Furthermore, the radio channel related information may be provided instead of a requested measurement native to the baseline method, e.g., when the requested measurement for the cell is not available or of a poor quality, or the cell was not included in the assistance data.

Example Node Configuration

Figure 8:
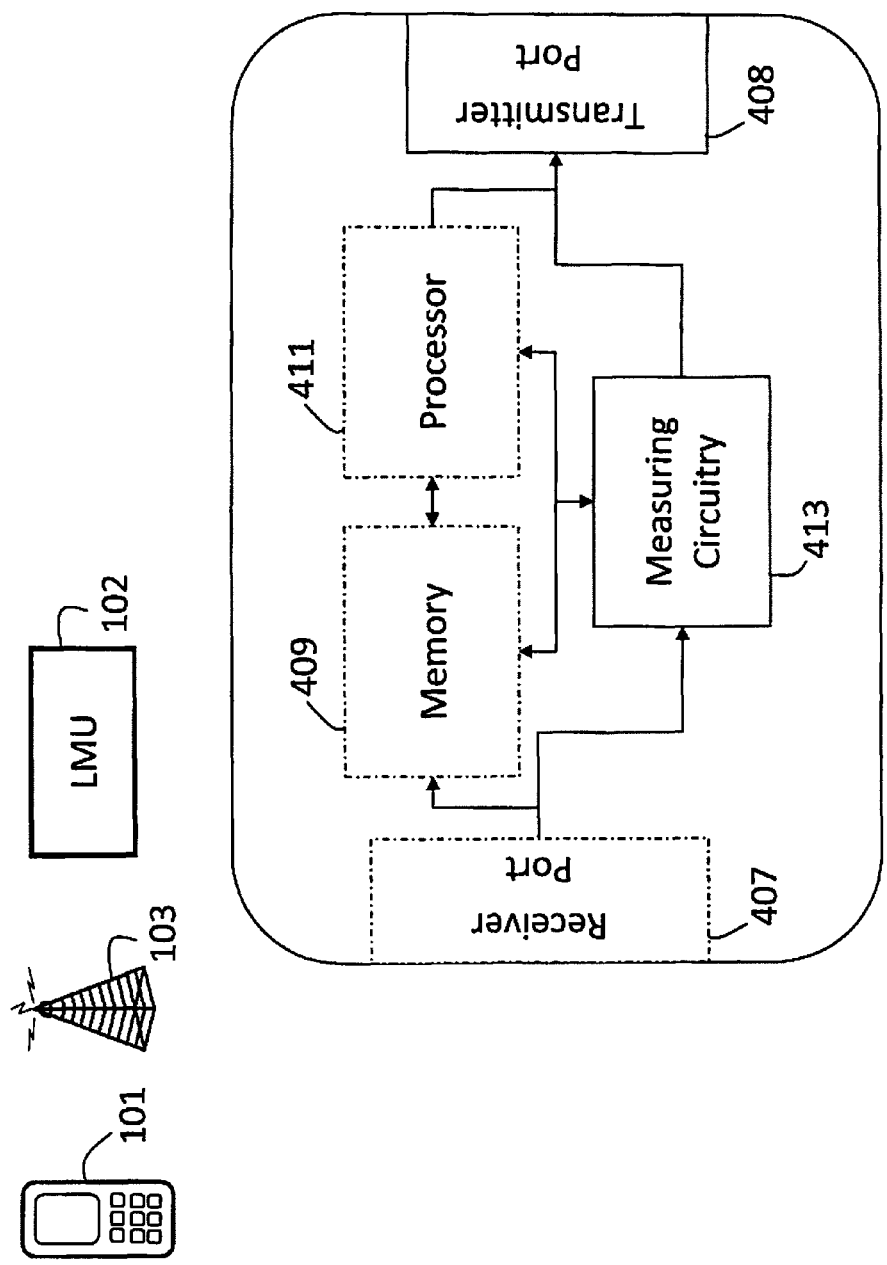
FIG. 8 is a schematic of a radio node, according to some of the example embodiments.

FIG. 8 illustrates an example of a radio node which may incorporate some of the example embodiments discussed above. According to some of the example embodiments, the radio node may be a base station 103, a Location Measurement Unit, LMU, node 102, or a user equipment 101.

As shown in FIG. 8, the node may comprise a receiver 407 and transmitter 408 ports configured to receive and transmit, respectively, any form of communications or control signals within a network. It should be appreciated that the receiver 407 and transmitter 408 ports may be comprised as a single transceiving unit or port. It should further be appreciated that the receiver 407 and transmitter 408 ports, or transceiving unit, may be in the form of any input/output communications port known in the art.

The radio node may further comprise at least one memory unit 409 that may be in communication with the receiver 407 and transmitter 408 ports. The memory unit 409 may be configured to store received or transmitted data and/or executable program instructions. The memory unit 409 may also be configured to store complementary positioning information or measurement instructions of any kind. The memory unit 409 may be any suitable type of computer readable memory and may be of volatile and/or non-volatile type.

The radio node further comprises a measuring circuitry 413 which is configured to aid in the performance of positioning measurements. The node may further comprise a general processor 411.

The measuring circuitry 413 and/or the general processor 411 may be any suitable type of computation unit, e.g. a microprocessor, digital signal processor (DSP), field programmable gate array (FPGA), or application specific integrated circuit (ASIC), or any form of processing circuitry. It should be appreciated that the measuring circuitry 413 and/or the general processor 411 may be comprised as a single unit or any number of units.

Figure 9:
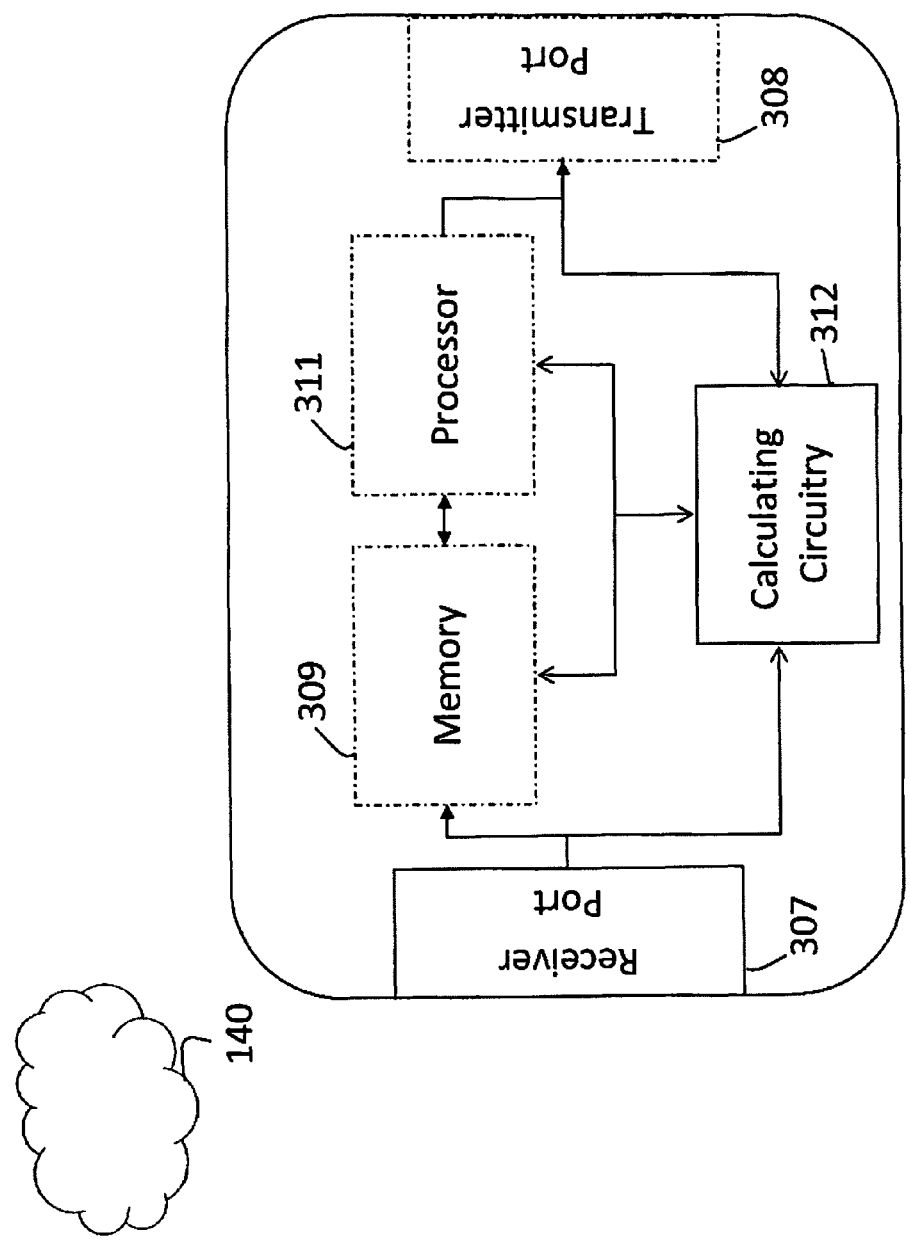
FIG. 9 is a schematic of a positioning node, according to some of the example embodiments.

FIG. 9 illustrates an example of a positioning node 140 which may incorporate some of the example embodiments discussed above. According to some of the example embodiments, the positioning node 140 may be a Secure User Plane Location (SUPL) Location Center (SLC) node 113a, an Enhanced Serving Mobile Location Center (E-SMLC) node 119 and/or a SUPL Positioning Center (SPC) node 113b.

As shown in FIG. 9, node 140 comprises a receiver 307 and transmitter 308 ports configured to receive and transmit, respectively, any form of communications or control signals within a network. It should be appreciated that the receiver 307 and transmitter 308 ports may be comprised as a single transceiving unit or port. It should further be appreciated that the receiver 307 and transmitter 308 ports, or transceiving unit, may be in the form of any input/output communications port known in the art.

The positioning node 140 may further comprise at least one memory unit 309 that may be in communication with the receiver 307 and transmitter 308 ports. The memory unit 309 may be configured to store received or transmitted data and/or executable program instructions. The memory unit 309 may also be configured to store complementary positioning information or measurement instructions of any kind. The memory unit 309 may be any suitable type of computer readable memory and may be of volatile and/or non-volatile type.

The node 140 further comprises an instructions circuitry 312 which is configured to analyze, determine or alter measurement instructions based on the complementary positioning information. The node may further comprise a general processor 311.

The instructions circuitry 312 and/or the general processor 311 may be any suitable type of computation unit, e.g. a microprocessor, digital signal processor (DSP), field programmable gate array (FPGA), or application specific integrated circuit (ASIC), or any other type of processing circuitry. It should be appreciated that the instructions circuitry 312 and/or the general processor 311 may be comprised as a single unit or any number of units.

Example Node Operations

Figure 10:
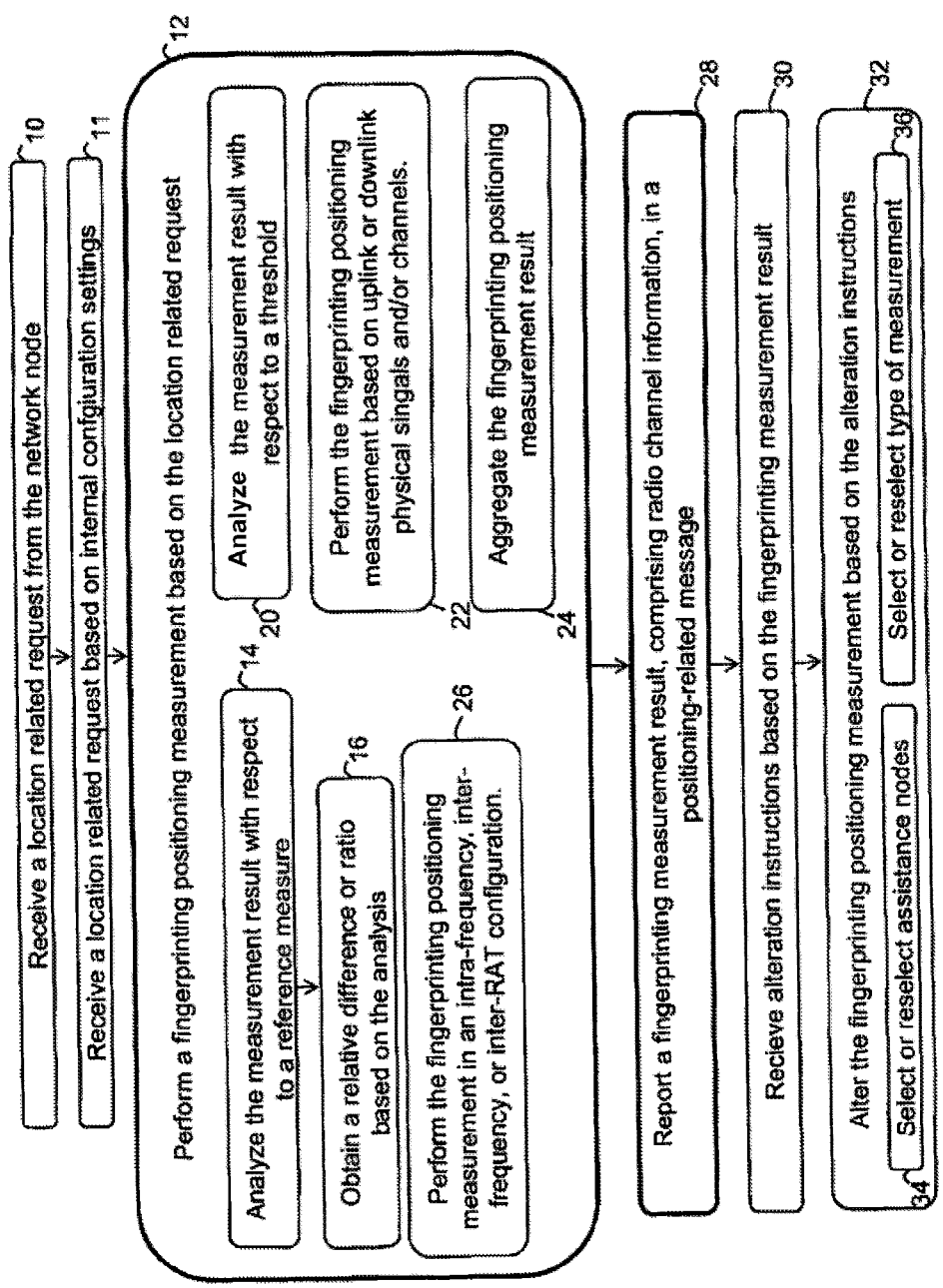
FIG. 10 is a flow diagram depicting example operations of the radio node of FIG. 8, according to some of the example embodiments.

FIG. 10 is a flow diagram depicting example operational steps which may be taken by the radio node of FIG. 8 in providing a fingerprinting positioning measurement. It should be appreciated that the radio node may be a base station, user equipment, a Location Measurement Unit (LMU) or any other gateway node. In some of the example operations a positioning node is discussed. The positioning node may be a Secure User Plane Location (SUPL) Location Center (SLC) node 113a, an Enhanced Serving Mobile Location Center (E-SMLC) node 119 and/or a SUPL Positioning Center (SPC) node 113b. In some of the example embodiments, a network node is discussed. The network node may be a positioning node or any type of gateway node.

Example Operation 10:

According to some of the example embodiments, the radio node may be configured to receive 10 a location related request from a network node. The receiver port 407 may be configured to receive the location related request from the network node. It should be appreciated that the radio node may receive the request from any network node or may receive any number of requests from any number of network nodes.

Example Operation 11:

According to some of the example embodiments, the radio node may be configured to receive 11 a location related request from within the radio node based on an internal configuration setting. The measuring circuitry 413 may be configured to receive the location related request from within the radio node based on the internal configuration settings.

Examples of such configuration settings may be a time-based configuration where the radio node may be configured to issue itself a location related request at a pre-determined time or time interval. Another example of a configuration setting is an event-based request where the radio node may be configured to issue itself a location request once the radio node has entered a predetermined cell, routing area, tracking area, etc. It should be appreciated that any other configuration settings may be employed in the providing of a location related request.

Operation 12:

The radio node is configured to perform 12 a fingerprinting positioning measurement based on the location related request. The measuring circuitry 413 is configured to perform the fingerprinting positioning measurement based on the location related request. It should be appreciated that the fingerprinting positioning measurement may comprise any of the measurements discussed in the sub-heading 'Radio Measurements'.

It should be appreciated that a measurement result is provided as a result of the fingerprinting positioning measurement. The measurement result comprises radio channel related information. Some examples of radio channel related information may be at least one of Doppler, speed, and/or delay spread information. It should be appreciated that radio channel related information may also comprise any other form of information discussed under the sub-heading 'Radio Channel Related Information'.

It should also be appreciated that the fingerprinting positioning measurement and/or the measurement result may be associated with at least one of AECID, E-CID, RF fingerprinting, and/or pattern matching. It should further be appreciated that, according to some example embodiments, the measurement result may comprise a fingerprint.

Example Operation 14:

According to some of the example embodiments, the performing 12 may further comprise analyzing 14 a measurement result with respect to a reference measure. The measuring circuitry 413 may be configured to analyze the measurement result with respect to the reference measure. Such analysis is described under the sub-heading 'Radio Channel Related Information' in relation to delay spread information and Doppler and speed information.

Example Operation 16:

According to some of the example embodiments, the performing 12 and analyzing 14 may further comprise obtaining 16 a relative difference or ratio based on the analyzing 14. The measuring circuitry 413 may be configured to obtain the relative difference or ratio based on the analyzing. Such relative differences or ratios are described under the sub-heading 'Radio Channel Related Information' in relation to delay spread information and Doppler and speed information.

Example Operation 20:

According to some of the example embodiments, the performing 12 may further comprising analyzing 20 the measurement result with respect to at least one threshold related to an environmental characteristic. The measuring circuitry 413 may be configured to analyze the measurement result with respect to at least one threshold related to an environmental characteristic.

Use of environmental characteristics is described under the sub-heading 'Radio Channel Related Information' in relation to delay spread information and Doppler and speed information. Use of environmental characteristics is further described under the sub-heading 'Using Radio Channel Related Information for Positioning' in relation to using Doppler information and speed information.

Example Operation 22:

According to some of the example embodiments, the performing 12 may further comprise performing 22 the fingerprinting positioning measurement based on uplink or downlink physical signals and/or channels. The measuring circuitry 413 may be configured to perform the fingerprinting positioning measurement based on the uplink or downlink physical signals and/or channels.

Use of such uplink or downlink physical signals and/or channels is described under the sub-heading 'Radio Channel Related Information' in relation to delay spread information and Doppler and speed information.

Example Operation 24:

According to some of the example embodiments, the performing 12 may further comprise aggregating 24 the measurement result to reflect multiple cells. The measuring circuitry 413 may aggregate the measurement result to reflect multiple cells.

Use of such aggregation is described under the sub-heading 'Radio Channel Related Information' in relation to delay spread information and Doppler and speed information.

Example Operation 26:

According to some of the example embodiments, the performing 12 may further comprise performing 26 the fingerprinting positioning measurement in an intra-frequency, inter-frequency, or inter-Radio Access Technology configuration. The measuring circuitry 413 may perform the fingerprinting positioning measurement in an intra-frequency, inter-frequency, or inter-Radio Access Technology configuration.

Use of such configurations is described under the sub-heading 'Radio Channel Related Information' in relation to delay spread information and Doppler and speed information.

Operation 28:

The radio node is also configured to report 28, to a network node, the measurement result of the fingerprinting positioning measurement in a positioning-related message. The measurement result comprises radio channel related information. The transmitter port 408 is configured to report, to the network node, the measurement result of the fingerprinting positioning measurement in the positioning-related message. According to some of the example embodiments, the positioning related message may be an assistance data request message or a measurement report message.

Example Operation 30:

According to some of the example embodiments, the radio node may be further configured to receive, from the network node, alteration instructions based on the measurement result. The receiver port 407 may be configured to receive, from the network node, alteration instructions based on the measurement result.

Example Operation 32:

According to some of the example embodiments, the receiving 30 may further comprise altering 32 the fingerprinting positioning measurement based on the alteration instructions. The measuring circuitry 413 may be configured to alter the fingerprinting positioning measurement based on the alteration instructions.

Example Operation 34:

According to some of the example embodiments, the altering 32 may further comprise selecting or reselecting 34 positioning assisting radio nodes or a positioning method. The measuring circuitry 413 may be configured to select or reselect the positioning assisting radio nodes or the positioning method. Use of such alterations is described under the sub-heading 'Using Radio Channel Related Information for Positioning'.

Example Operation 36:

According to some of the example embodiments, the altering 32 may further comprise selecting or reselecting 36 a type of fingerprinting positioning measurement to be performed. The measurement circuitry 413 may be configured to select or reselect a type of fingerprinting positioning measurement to be performed. Use of such alterations is described under the sub-heading 'Using Radio Channel Related Information for Positioning'.

Figure 11:
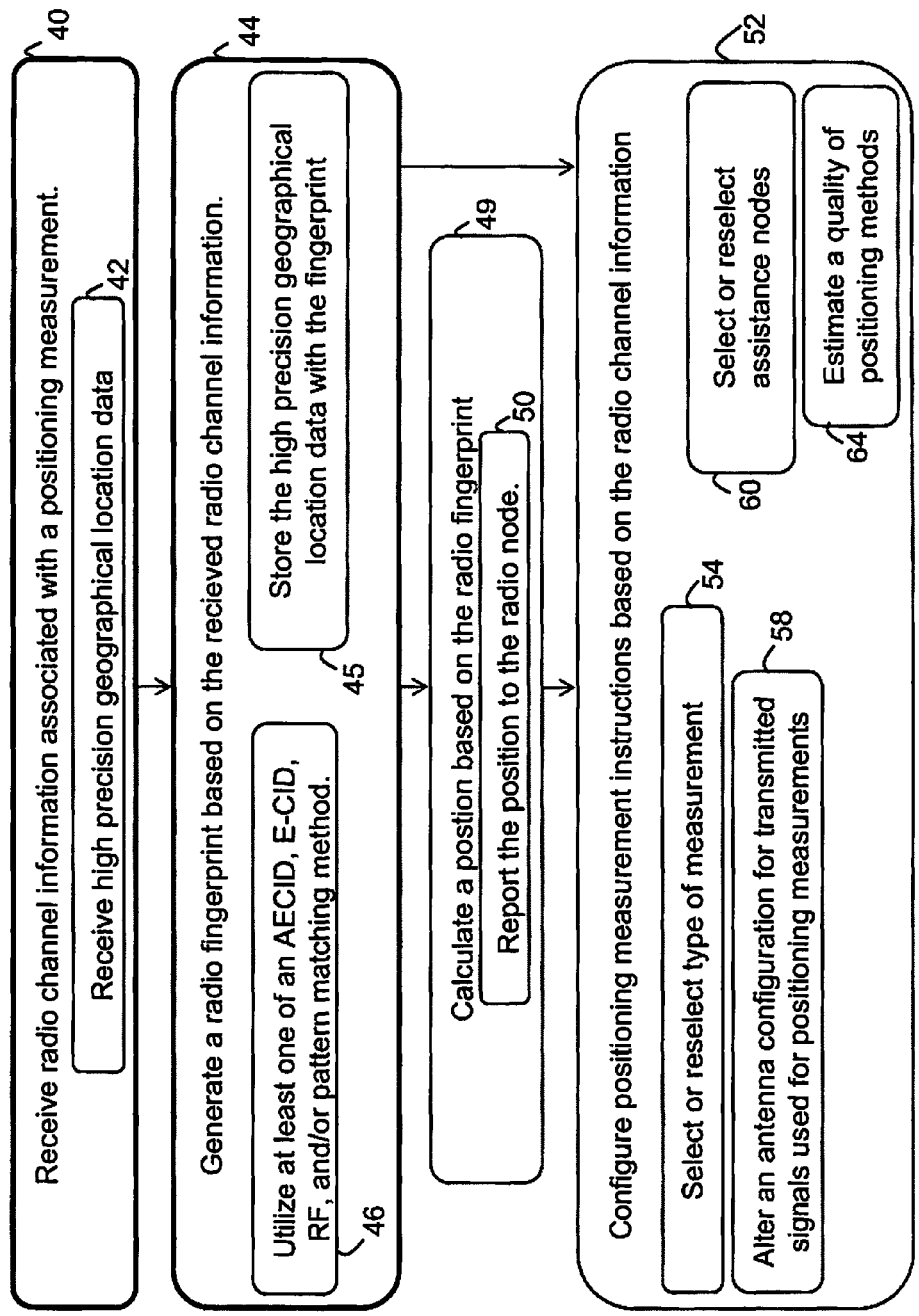
FIG. 11 is a flow diagram depicting example operations of the positioning node of FIG. 9, according to some of the example embodiments.

FIG. 11 is a flow diagram depicting example operational steps which may be taken by the positioning node of FIG. 9 for fingerprinting positioning management. It should be appreciated that the positioning node may be a Secure User Plane Location (SUPL) Location Center (SLC) node 113*a*, an Enhanced Serving Mobile Location Center (E-SMLC) node 119 and/or a SUPL Positioning Center (SPC) node 113*b*. In the example operations provided below a radio node is discussed. It should be appreciated that the radio node may be a base station 103, a LMU, and/or a user equipment 101. In some of the example embodiments, a network node is discussed. The network node may be a positioning node or any type of gateway node.

Operation 40:

The positioning node is configured to receive 40, from a radio node, radio channel related information associated with a positioning measurement. The receiver port 307 is configured to receive, from the radio node, the radio channel related information associated with the positioning measurement.

Some examples of radio channel related information may be at least one of Doppler, speed, and/or delay spread information. It should be appreciated that radio channel related information may also comprise any other form of information discussed under the sub-heading 'Radio Channel Related Information'.

Example Operation 42:

According to some of the example embodiments, the positioning node may be further configured to receive 42 high precision geographical location data. The high precision geographical data may be associated with the received radio channel related information. According to some of the example embodiments, the high precision is received from the radio node, which may be a user equipment or a radio network node. The receiver port 307 may be configured to receive the high precision geographical location data. According to some of the example embodiments, the data may be received, e.g., via LPPa from the eNodeB. According to some of the example embodiments, the data may be received e.g. via LPP from UE, where the high-precision geographical data may comprise UL location information obtained with GNSS, A-GNSS or another high-accuracy positioning method.

Operation 44:

The positioning node is further configured to generate 44 a radio fingerprint based on the received radio channel related information. The calculating circuitry 312 is configured to generate the radio fingerprint based on the received radio channel related information.

Example Operation 45:

According to some of the example embodiments, the generating 44 may further comprise storing 45 the fingerprint and high precision geographical location data in a fingerprinting database. The calculating circuitry 313 and/or memory 309 may be configured to store 45 the fingerprint and high precision geographical location data in the fingerprinting database.

Example Operation 46:

According to some of the example embodiments, the generating 44 may further comprise utilizing 46 at least one of an AECID, E-CID, RF fingerprinting and/or a pattern matching method. The calculating circuitry 312 may be configured to utilize at least one of an AECID, E-CID, RF fingerprinting and/or a pattern matching method.

Example Operation 49:

According to some of the example embodiments, the positioning node may be further configured to calculate 49 a position based on the radio fingerprint. The calculating circuitry 312 may be configured to calculate 49 the position based on the radio fingerprint.

Example Operation 50:

According to some of the example embodiments, the calculating 49 may further comprise reporting 50 the position to the radio node, where the radio node may be a user equipment or a radio network node. The calculating circuitry 312 and/or the transmitter port 308 may be configured to report the position to the radio node.

Example Operation 52:

According to some of the example embodiments, the positioning node may be further configure 52 positioning measurement instructions based on the received radio channel related information and send the positioning measurement instructions to the radio node. The calculating circuitry 312 may configure 52 the positioning measurement instructions based on the received radio channel related information. The transmitter port 308 may be configured to send the positioning measurement instructions to the radio node.

Example Operation 54:

According to some of the example embodiments, the configuring 52 may further comprising configuring 54 positioning measurement instructions for selecting or reselecting a type of fingerprinting measurement to be performed. The calculating circuitry may configure positioning measurement instructions for selecting or reselecting a type of fingerprinting measurement to be performed. Use of such configurations is described under the sub-heading 'Using Radio Channel Related Information for Positioning'.

Example Operation 58:

According to some of the example embodiments, the configuring 52 may further comprising configuring 58 positioning measurement instructions for altering an antenna configuration for transmitting signals used for positioning measurements. The calculating circuitry may configure positioning measurement instructions for altering an antenna configuration for transmitting signals used for positioning measurements. Use of such configurations is described under the sub-heading 'Methods of Optimizing Signal Transmissions'.

Example Operation 60:

According to some of the example embodiments, the configuring 52 may further comprising configuring 60 positioning measurement instructions for selecting or reselecting positioning assisting radio nodes or a positioning method. The calculating circuitry may configure positioning measurement instructions for selecting or reselecting positioning assisting radio nodes or a positioning method. Use of such configurations is described under the sub-heading 'Using Radio Channel Related Information for Positioning'.

Example Operation 64:

According to some of the example embodiments, the configuring 52 may further comprise estimating 64 a quality of other positioning methods, associated with the radio node and/or other radio nodes, based on the received radio channel related information. The calculating circuitry may be configured to estimate the quality of other positioning methods, associated with the radio node and/or other radio nodes, based on the received radio channel related information. Use of such estimation, or evaluation of accuracy or reliability, is described under the sub-heading 'Using Radio Channel Related Information for Positioning'.

CONCLUSION

The embodiments described herein are not limited to a specific measurement, unless clearly stated. The signalling described in the example embodiments is either via direct links (protocols or physical channels) or logical links (e.g. via higher layer protocols and/or via one or more network nodes). For example, in LTE in the case of signalling between E-SMLC and LCS Client the positioning result may be transferred via multiple nodes (at least via MME and/or GMLC).

Although the description is mainly given for a user equipment, as measuring unit, it should be understood by the skilled in the art that "user equipment" is a non-limiting term which means any wireless device or node capable of receiving in DL and transmitting in UL (e.g. PDA, laptop, mobile, sensor, fixed relay, mobile relay or even a radio base station, e.g. femto base station). The example embodiments may apply for non-CA UE or both for user equipments capable and not capable of performing inter-frequency measurements without gaps, e.g. also including user equipments capable of carrier aggregation.

Positioning node described in different embodiments is a node with positioning functionality. For example, for LTE it may be understood as a positioning platform in the user plane (e.g., SLP in LTE) or a positioning node in the control plane (e.g., E-SMLC in LTE). SLP may also consist of SLC and SPC, where SPC may also have a proprietary interface with E-SMLC. In a testing environment, at least positioning node may be simulated or emulated by test equipment.

A radio node is used herein to refer to UE or radio network node. A cell is associated with a radio node, where a radio node or radio network node or base station used interchangeably in the example embodiment description, comprises in a general sense any node transmitting radio signals used for measurements, e.g., base station, macro/micro/pico base station, home base station, relay, beacon device, or repeater. A radio node herein may comprise a radio node operating in one or more frequencies or frequency bands. It may be a radio node capable of CA. It may also be a single- or muti-RAT node. A multi-RAT node may comprise a node with co-located RATs or supporting multi-standard radio (MSR) or a mixed radio node.

Some positioning methods require measurements with multiple radio nodes, e.g., multiple radio nodes transmitting signals from distinct locations are necessary for OTDOA and multiple radio nodes receiving signals at distinct locations are necessary for UTDOA. Such radio nodes are referred herein as assisting nodes. The assisting nodes may or may not include the serving node.

The example embodiments presented herein are not limited to LTE, but may apply in any RAN, single- or multi-RAT. Some other RAT examples are LTE-Advanced, UMTS, HSPA, GSM, cdma2000, HRPD, WiMAX, and WiFi. The foregoing description of the example embodiments have been presented for purposes of illustration and description.

The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some example embodiments may comprise a portable or non-portable telephone, media player, Personal Communications System (PCS) user equipment, Personal Data Assistant (PDA), laptop computer, palmtop receiver, camera, television, and/or any appliance that comprises a transducer designed to transmit and/or receive radio, television, microwave, telephone and/or radar signals.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications may be made to these embodiments. Furthermore, it should be appreciated that the example embodiments presented herein may be used in any combination with one another. Accordingly, although specific terms are employed, they are used in a generic and descriptive sense only and not for purposes of limitation, the scope of the embodiments being defined by the following claims.

The invention claimed is:

1. A method for fingerprinting positioning measurement, the method being implemented by a radio node in a wireless communications network and comprising:
   requesting to receive radio channel-related information;
   receiving the radio channel-related information by the radio node;
   performing a fingerprinting positioning measurement based on a location-related request; and
   enhancing the fingerprinting positioning measurement with the radio channel-related information;

analyzing a measurement result with respect to a reference measure;
obtaining a relative difference or ratio based on the analyzing;
reporting the measurement result of the fingerprinting positioning measurement in a positioning-related message to a network node, wherein the measurement result comprises the fingerprinting positioning measurement enhanced with the radio channel-related information for use in optimizing signal transmissions, and wherein the radio channel-related information comprises at least one of Doppler information, speed information, and delay spread information;
receiving, from the network node, alteration instructions based on the measurement result; and
altering the fingerprinting positioning measurement based on the alteration instructions to select or re-select assistance nodes and type of measurements.

2. The method of claim 1 wherein the fingerprinting positioning measurement, the measurement result, or both, are associated with at least one of:
an Adaptive Enhanced Cell Identification;
an Enhanced Cell Identification;
Radio Frequency fingerprinting; and
pattern matching.

3. The method of claim 1 further comprising receiving the location-related request from a network node.

4. The method of claim 1 further comprising receiving the location-related request within the radio node based on an internal configuration setting.

5. The method of claim 1 wherein the performing further comprises analyzing the measurement result with respect to at least one pre-defined threshold related to an environmental characteristic.

6. The method of claim 1 wherein the performing further comprises performing the fingerprinting positioning measurement based on uplink or downlink physical signals and/or channels.

7. The method of claim 1 wherein the fingerprinting positioning measurement is performed in an intra-frequency configuration, an inter-frequency configuration, or an inter-Radio Access Technology configuration.

8. The method of claim 1 wherein the performing further comprises aggregating the measurement result to reflect multiple cells.

9. The method of claim 1 wherein the positioning-related message is an assistance data request message or a measurement report message.

10. The method of claim 1 wherein the measurement result comprises a radio fingerprint.

11. A radio node for fingerprinting positioning measurement, the radio node being part of a wireless communications network and comprising:
a receiver configured to receive radio channel-related information requested by the radio node;
measurement circuitry configured to:
perform a fingerprinting positioning measurement according to a location-related request; and
enhance the fingerprinting positioning measurement with the radio channel-related information;
analyze the measurement result with respect to a reference measure; and
obtain a relative difference or ratio based thereon;
a transmitter configured to report, to a network node, a measurement result of the fingerprinting positioning measurement in a positioning message, wherein the measurement result comprises the fingerprinting positioning measurement enhanced with the radio channel-related information for use in optimizing signal transmissions,
wherein the radio channel-related information comprises at least one of Doppler information, speed information, and delay spread information; and
wherein the receiver is further configured to:
receive, from the network node, alteration instructions based on the measurement result; and
wherein the measurement circuitry is further configured to alter the fingerprinting positioning measurement based on the alteration instructions to select or re-select assistance nodes and type of measurements.

12. The radio node of claim 11 wherein the network node is a positioning node or a gateway node.

13. The radio node of claim 11 wherein the radio node is one of:
a user equipment;
a base station;
a Location Measurement Unit; or
a gateway node.

14. The radio node of claim 11 wherein the fingerprinting positioning measurement, the measurement result, or both, are associated with at least one of:
an Adaptive Enhanced Cell Identification;
an Enhanced Cell Identification;
Radio Frequency fingerprinting; and
pattern matching.

15. The radio node of claim 11 wherein the receiver is further configured to receive the location-related request from the network node.

16. The radio node of claim 11 wherein the measuring circuitry is further configured to receive the location-related request based on an internal configuration setting.

17. The radio node of claim 11 wherein the measurement circuitry is further configured to analyze the measurement result with respect to at least one pre-defined threshold related to an environmental characteristic.

18. The radio node of claim 11 wherein the measurement circuitry is further configured to perform the fingerprinting positioning measurement based on uplink or downlink physical signals and/or channels.

19. The radio node of claim 11 wherein the measurement circuitry is further configured to perform the fingerprinting positioning measurement in an intra-frequency configuration, an inter-frequency configuration, or an inter-Radio Access Technology configuration.

20. The radio node of claim 11 wherein the measurement circuitry is further configured to aggregate the measurement result to reflect multiple cells.

21. The radio node of claim 11 wherein the measurement result comprises a radio fingerprint.

22. The radio node of claim 11 wherein the positioning-related message is an assistance data request or a measurement report message.

* * * * *